US011585753B2

(12) United States Patent
McCartt et al.

(10) Patent No.: US 11,585,753 B2
(45) Date of Patent: Feb. 21, 2023

(54) TRACE GAS DETECTION WITH 2-PHOTON, 2-COLOR, CAVITY RING-DOWN SPECTROSCOPY

(71) Applicant: Lawrence Livermore National Security, LLC, Livermore, CA (US)

(72) Inventors: Daniel McCartt, Johnson City, TN (US); Jun Jiang, Fremont, CA (US)

(73) Assignee: LAWRENCE LIVERMORE NATIONAL SECURITY, LLC, Livermore, CA (US)

(*) Notice: Subject to any disclaimer, the term of this patent is extended or adjusted under 35 U.S.C. 154(b) by 0 days.

(21) Appl. No.: 17/709,222

(22) Filed: Mar. 30, 2022

(65) Prior Publication Data

US 2022/0326150 A1 Oct. 13, 2022

Related U.S. Application Data

(60) Provisional application No. 63/167,727, filed on Mar. 30, 2021.

(51) Int. Cl.
*G01N 21/39* (2006.01)
*G01J 3/42* (2006.01)

(52) U.S. Cl.
CPC .............. *G01N 21/39* (2013.01); *G01J 3/42* (2013.01); *G01N 2021/391* (2013.01)

(58) Field of Classification Search
CPC ...... G01N 21/39; G01N 2021/391; G01J 3/42
See application file for complete search history.

(56) References Cited

U.S. PATENT DOCUMENTS

| | | | |
|---|---|---|---|
| 6,084,682 A | 7/2000 | Zare et al. | |
| 9,645,077 B2 | 5/2017 | Ognibene et al. | |
| 2005/0206903 A1 | 9/2005 | Tan et al. | |
| 2006/0181710 A1 | 8/2006 | Kachanov et al. | |
| 2007/0252995 A1* | 11/2007 | Shaw | G01N 21/552 356/437 |
| 2008/0111077 A1 | 5/2008 | Miller | |

(Continued)

FOREIGN PATENT DOCUMENTS

WO 0043742 A1 7/2000

OTHER PUBLICATIONS

International Search Report and Written Opinion dated Jul. 14, 2022 for International Patent Application No. PCT/US2022/022636.

(Continued)

*Primary Examiner* — Shawn Decenzo
(74) *Attorney, Agent, or Firm* — Perkins Coie LLP

(57) ABSTRACT

In one aspect, a method of detecting a trace gas is disclosed. The method includes containing the trace gas in an optical cavity. The method further includes injecting a first laser light from a first laser into the optical cavity causing the trace gas to transition from an energy state lower that a first excited energy state to the first excited energy state, and injecting a second laser light from a second laser into the optical cavity causing the trace gas to transition from the first excited energy state to a second excited energy state. The method includes measuring, by a detector, a first cavity ringdown intensity as a function of time after turning off the second laser with the first laser on, and a second cavity ringdown intensity as a function of time after turning off the second laser with the first laser off.

23 Claims, 13 Drawing Sheets

(56) References Cited

U.S. PATENT DOCUMENTS

| | | | | |
|---|---|---|---|---|
| 2008/0144007 | A1* | 6/2008 | Kachanov | G01N 21/00 356/440 |
| 2008/0204708 | A1* | 8/2008 | Shaw | G01N 21/552 385/12 |
| 2022/0138608 | A1* | 5/2022 | Ramette | G06N 10/20 716/100 |

OTHER PUBLICATIONS

Anderson, D. Z., Frisch, J. C., & Masser, C. S. (1984). Mirror reflectometer based on optical cavity decay time. Applied Optics, 23(8), 1238. Retrieved from http://www.ncbi.nlm.nih.gov/pubmed/18204709.

Herbelin, J. M., & McKay, J. A. (1981). Development of laser mirrors of very high reflectivity using the cavity-attenuated phase-shift method. Applied Optics, 20(19), 3341-3344. Retrieved from http://www.ncbi.nlm.nih.gov/pubmed/20333153.

Hu, C.-L., et al. (2020). Optical-Optical Double-Resonance Absorption Spectroscopy of Molecules with Kilohertz Accuracy. The Journal of Physical Chemistry Letters, 7843-7848. https://doi.org/10.1021/acs.jpclett.0c02136.

Karhu, J., Lehmann, K., Vainio, M., Metsälä, M., & Halonen, L. (2018). Step-modulated decay cavity ringdown detection for double resonance spectroscopy. Optics Express, 26(22), 29086. https://doi.org/10.1364/oe.26.029086.

Lehmann, K. K. (2019). Resonance enhanced two-photon cavity ring-down spectroscopy of vibrational overtone bands: a proposal. Retrieved from http://arxiv.org/abs/1908.00643.

O'Keefe, A., & Deacon, D. A. G. (1988). Cavity ring-down optical spectrometer for absorption measurements using pulsed laser sources. Review of Scientific Instruments, 59(12), 2544. https://doi.org/10.1063/1.1139895.

Picque, J. L., & Pinard, J. (1976). Direct observation of the Autler-Townes effect in the optical range. Journal of Physics B: Atomic and Molecular Physics, 9(5). https://doi.org/10.1088/0022-3700/9/5/003.

Zhao, G., et al. (2020). Doppler-free two-photon cavity ring-down spectroscopy of a nitrous oxide ($N_2O$) vibrational overtone transition. Physical Review A, 101(6). https://doi.org/10.1103/PhysRevA.101.062509.

\* cited by examiner

TRACE GAS DETECTION WITH 2-PHOTON, 2-COLOR, CAVITY RING-DOWN SPECTROSCOPY

CROSS-REFERENCE TO RELATED APPLICATIONS

This patent document claims priority to, and the benefit of, U.S. Provisional Patent Application No. 63/167,727 entitled "TRACE GAS DETECTION WITH 2-PHOTON, 2-COLOR, CAVITY RING-DOWN SPECTROSCOPY" filed on Mar. 30, 2021. The entire content of the aforementioned patent application is incorporated by reference as part of the disclosure of this patent document.

STATEMENT REGARDING FEDERALLY SPONSORED RESEARCH

This invention was made with Government support under Contract No. DE-AC52-07NA27344 awarded by the United States Department of Energy. The Government has certain rights in the invention.

TECHNICAL FIELD

This patent document relates to measuring and identifying trace gasses.

BACKGROUND

Many scientific, industrial, medical, and manufacturing processes require determining the presence of and identification of trace gasses. Current approaches have limited sensitivity and selectivity. New approaches are needed to selectively identify trace amounts of gasses.

SUMMARY

Disclosed are apparatuses and techniques for detecting trace gases in a high-finesse optical cavity with two lasers used to detect gaseous species via electromagnetic radiation. An analyte is introduced in between highly reflective mirrors of a cavity. Light from a "pump" laser is injected into the cavity and transitions the analyte into an excited state. A "probe" laser measures the population of this excited state using cavity ring-down spectroscopy (CRDS). The pump is then turned off, and the probe can then measure the background signal. This 2-photon, 2-color, cavity ring-down spectroscopy (2P3C) methodology solves inherent sensitivity flaws of CRDS involving baseline variations. It also removes interference from nearby absorbing features.

In one aspect, a method of detecting a trace gas is disclosed. The method includes containing the trace gas in an optical cavity. The method further includes injecting a first laser light from a first laser into the optical cavity causing the trace gas to transition to a first excited energy state, and injecting a second laser light from a second laser into the optical cavity causing the trace gas to transition from the first excited energy state to a second excited energy state. Trace gas molecules are excited from the first to the second excited state which contributes to the ring-down signal. In some example embodiments, the trace gas is not pumped directly into the second excited energy state without being first pumped into the first excited energy state. The method includes measuring, by a detector, a first cavity ringdown intensity as a function of time after turning off the second laser.

The following features can be included in various combinations. The method further includes turning off the first laser or stopping injection, injecting the second laser light from the second laser into the optical cavity to transition from the first excited energy state to the second excited energy state in the absence of the first laser light, or turning off the second laser or stopping injection of the second laser light. In some example embodiments, an acousto-optic modulator redirects the first laser or second laser to stop injection instead of turning the respective laser off. The method further includes measuring, by the detector, a second cavity ringdown intensity as a function of time. The second cavity ringdown indicates a cavity ringdown rate for the cavity with no absorption from the trace gas, and with absorption from molecular species other than the trace gas and with cavity absorption. Said differently, the second cavity ringdown indicates a cavity ringdown rate for the cavity with no absorption from the trace gas that was previously transitioned to the first excited energy state by the first laser and with absorption from molecular species other than the excited trace gas and cavity absorption. In some example embodiments, when the first laser is turned off, no transition aided by this pump to the second excited state is observed. The trace gas is identified based on the first cavity ringdown intensity and the second cavity ringdown intensity over a measurement time. The first laser is a pump laser and the second laser is a probe laser, and wherein the pump and probe lasers are each frequency-locked, respectively, to a cavity resonance with frequency close to a molecular transition frequency. The second energy state is a higher energy state than the first energy state. The optical cavity is high finesse. The pump laser is horizontally polarized and the probe laser is vertically polarized, or the pump laser is vertically polarized and the probe laser is horizontally polarized. The optical cavity comprises two mirrors. The optical cavity is configured as a ring comprising three or more mirrors. The detector is a mercury cadmium telluride (MCT) detector or an indium antimonide (InSb) detector. The first laser or the second laser is a quantum cascade (QCL) laser. The transitions are coherent two-photon transitions and/or stepwise transitions with a populated intermediate state. After the injecting the first laser light and the injecting the second laser light and before measuring the first cavity ringdown intensity, collisions involving the trace gas cause energy transitions from the first excited energy state to one or more third excited energy states different from the second excited energy state.

In another aspect, a trace gas detection apparatus is disclosed. The apparatus includes an optical cavity containing a trace gas. The apparatus further includes a first laser configured to inject a first laser light into the optical cavity causing the trace gas in the analyte to transition to a first excited energy state, and a second laser configured to inject a second laser light into the optical cavity causing the trace gas to transition from the first excited energy state to a second excited energy state. The apparatus includes a detector configured to measure a first cavity ringdown intensity as a function of time after turning off the second laser.

The following features can be included in various combinations. The detector is further configured to measure a second cavity ringdown after turning off the first laser and/or stopping cavity injection, wherein the second cavity ringdown indicates a cavity ringdown rate for the cavity with no absorption from the trace gas, and with absorption from molecular species other than the trace gas and with cavity absorption. The trace gas is identified based on the first cavity ringdown intensity and the second cavity ringdown intensity over a measurement time. The first laser is a pump laser and the second laser is a probe laser, and wherein the pump and probe lasers are each frequency-locked, respectively, to a cavity resonance with a frequency close to a molecular transition frequency. The optical cavity is high finesse. The pump laser is horizontally polarized and the probe laser is vertically polarized, or the pump laser is vertically polarized and the probe laser is horizontally polarized, or the pump laser is right-hand circularly polarized and the probe laser is left-hand circularly polarized, or the pump laser is left-hand circularly polarized and the probe laser is right-hand circularly polarized. The optical cavity comprises two mirrors. The optical cavity is configured as a ring comprising three or more mirrors. The detector is a mercury cadmium telluride (MCT) detector or an indium antimonide (InSb) detector. The first laser or the second laser is a quantum cascade (QCL) laser.

DETAILED DESCRIPTION

Figure 1A:
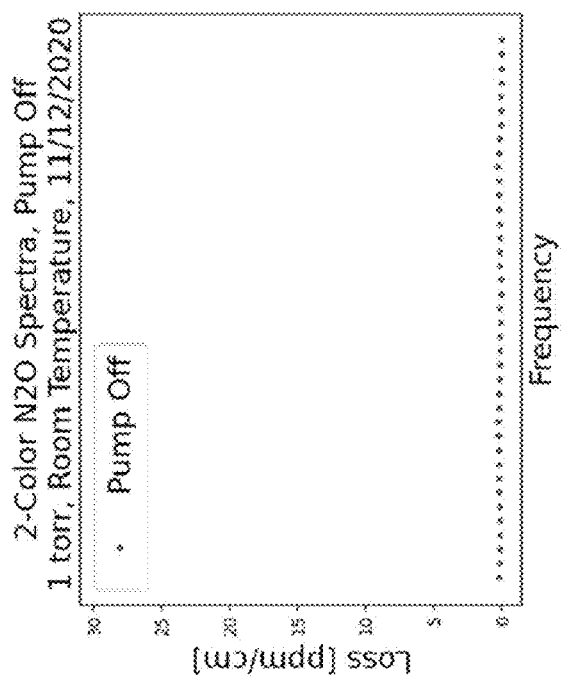
FIG. 1A shows an example baseline measurement system and corresponding data.
Figure 1A:
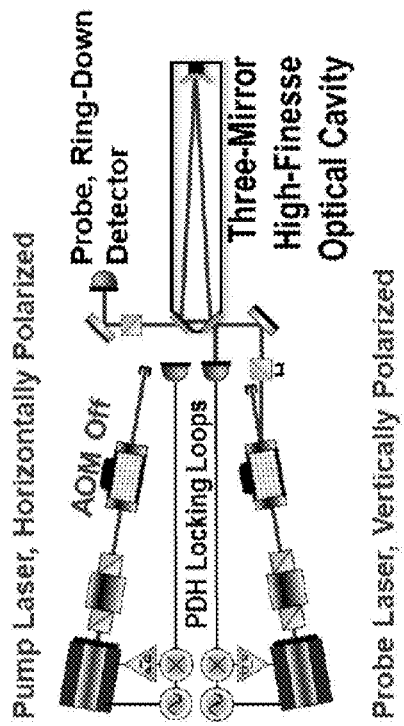

Section headings are used below to aid clarity without limiting the combinations of features that can be combined from the various sections.

The disclosed subject matter is used to detect minute quantities of gaseous species using laser spectroscopy. Previously, the most sensitive laser spectroscopy techniques utilize cavity-enhanced methods, but the sensitivity of cavity enhanced methods is hindered by variations in background signal measurement. Several techniques have attempted to address this technical problem, e.g., saturated-absorption cavity ring-down spectroscopy (SCAR) and noise-immune cavity-enhanced optical-heterodyne molecular spectroscopy (NICE-OHMS). SCAR uses a different but analogous background compensation technique; however, it requires more demanding experimental conditions (ultra-cold gas temperatures, specific cavity power conditions). Furthermore, unlike 2-Photon, 2-Color, Cavity ring-down spectroscopy (2P3C), SCAR is only realizable if the target molecule can be well saturated and does not saturate interfering species. NICE-OHMS was originally developed as a frequency standard, not for trace gas detection. Furthermore, NICE-OHMS requires laser modulation that is not achievable in all wavelength regions. 2P3C does not have these experimental requirements which will aid in sensitivity, adaptation, and deployment in the field. Additionally, because 2P3C uses two lasers to excite two transitions of the target species, it has greater detection specificity than other cavity-based methods which utilize only one transition.

2P3C requires two light sources, an optical cavity, and a detector. A gaseous analyte is introduced in between the highly reflective mirrors of the cavity. Light from the "pump" laser is injected into the cavity and excites the analyte into an elevated quantum state. The second "probe" laser measures the population of this excited state using cavity ring-down spectroscopy (CRDS). The pump is then turned off, and the probe can then measure the background of the CRDS signal. These two measurements combined allow for a direct measurement of the analyte and account for interference from other absorbing species and spectrometer background fluctuations.

The light sources should be of sufficient power and narrow frequency bandwidth to manipulate the quantum states of the gas in the optical cavity. To achieve these conditions, lasers are "locked" to the optical cavity by optical or electronic feedback. In some example embodiments, quantum cascade lasers (QCL) in the mid-IR were used. In the case of electronic feedback, the Pound-Drever-Hall technique was used, and the optical system was designed to limit feedback into the QCLs.

For 2P3C, optical cavity design is driven by two objectives: manipulation of the gaseous analyte quantum states and quality of the CRDS measurement. To pump and probe the lower and upper states of the gas under test, two lasers must be locked to the cavity and subsequently separated for analysis. This is possible with a 2-mirror linear cavity using faraday rotators or can be achieved with a circulating cavity with greater than two mirrors using polarization beam splitters. Alternatively, diffraction gratings could be used in either case. In some example embodiments, a three-mirror, ring cavity was used with the probe injected into the high-finesse vertical polarization orientation, and the pump locked to the lower-finesse horizontal polarization orientation. The selection of free-spectra-range spacing can be important when designing a 2P3C optical cavity so that detuning of the pump and probe lasers from their respective lower and upper transitions can be minimized, and the 2P3C signal can be maximized. For circulating cavities, geometries are selected so that the angle of incidence of reflections minimizes backscatter which can negatively affect the CRDS measurement. Finally, mirror transmission is selected to balance cavity internal power, ease of locking, and CRDS sensitivity. Transmission parameters that are too low make locking difficult and can cause unwanted saturation of the probe transition. Mirrors with transmission that is too high affects the CRDS sensitivity and cavity enhancement may not provide enough power to adequately populate the excited state to be probed with CRDS.

A detector is used to measure the CRDS signal. This detector should be sensitive to avoid saturating the probed transition. Mercury cadmium telluride (MCT) detectors and indium antimonide (InSb) mid-IR detectors were used.

Figure 1B:
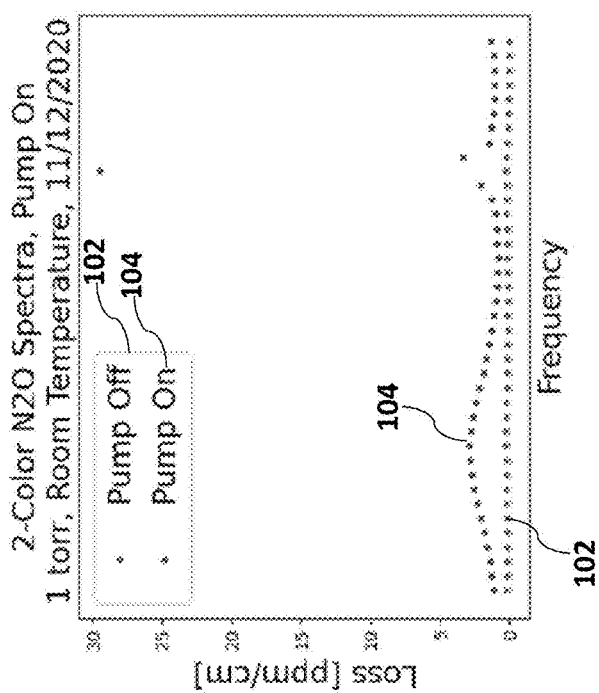
FIG. 1B shows an example measurement system and data for a 2-color measurement of an analyte.
Figure 1B:
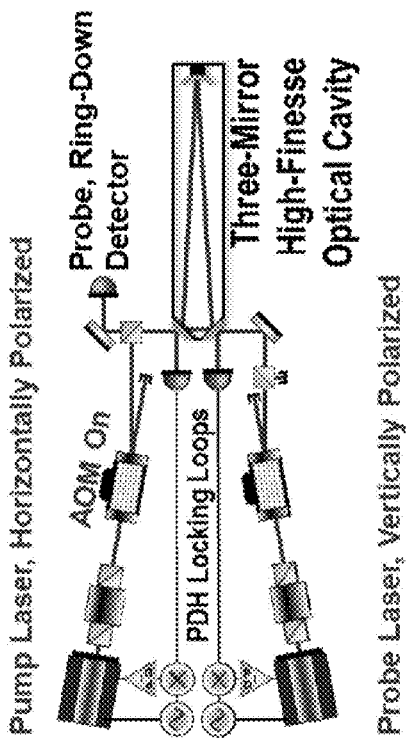

In FIGS. 1A and 1B, show an example system and data to illustrate how a 2P3C measurement is made. A baseline measurement mode is depicted in FIG. 1A. The pump laser is not injected into the cavity, and the probe measures the baseline from cavity losses and non-analyte gaseous absorption.

FIG. 1A shows an example baseline measurement system and corresponding data. To the left, the schematic represents components of a 2C3P (2-Color, 2-Photon, CRDS) measurement. The pump laser components indicated by red, while the probe laser components are denoted with blue. The pump laser is not injected into the optical cavity, and the probe laser measure baseline absorption with CRDS (loss) at the $N_2O$ R18e, 002←001 transition. This provides an accurate measurement of the cavity baseline and non-target gaseous absorption. Blue dots on the graph to the right, represent data collected during baseline measurement operation.

FIG. 1B shows an example measurement system and data for a 2-color measurement of the analyte. The pump laser is locked to the cavity which excites the analyte into an elevated quantum state. The probe laser then measures the now populated, elevated state.

The disclosed 2-photon, 2-color cavity ring-down spectroscopy combines two techniques in spectroscopy. The disclosed 3P2C is broadly applicable to almost any excitable gaseous molecule.

FIG. 1B shows an example of a 2C3P analyte measurement operation. To the left, the schematic shows the pump locked to the optical cavity near the P19e, 001←000 transition, and the probe laser measuring analyte absorption with CRDS (loss) at the $N_2O$ R18e, 002-001 transition. The graph plots both the analyte signal 104 ("pump on") and baseline signal 102 ("pump off"). The difference between these two measurements directly assesses the analyte concentration. For the "pump on" analyte signal both the doppler broadened and narrow, 2-photon, doppler free signal can be observed.

The 2P3C method offers the sensitivity of cavity-enhanced spectroscopic techniques without exacting experimental conditions. 2P3C can measure nearly any species that can be excited into an elevated state. Baseline variation has been a main hinderance to previous cavity-enhanced techniques ultimate sensitivity and accuracy. The disclosed 2P3C solves this problem by turning the target species absorption "off" and "on" using a pump laser. Because of the increased sensitivity, the disclosed 2P3C can measure ultratrace species such as less abundant isotopologues and radioisotopes which are not accessible by other laser-based spectroscopic techniques. Additionally, because 2P3C does not require the exacting experimental conditions of other cavity-enhanced techniques, the methodology is amenable to field deployment. For example, a competing technique, SCAR requires samples to be cooled to ultra-cold temperatures (~200 K) to achieve maximum sensitivity. This greatly inhibits the deployment of a SCAR system outside of a laboratory environment. 2P3C can be performed at elevated temperatures lending itself to industrial and environmental applications.

Cavity ringdown (CRD) spectroscopy is a highly-sensitive, absorption-based detection method that provides accurate quantification of trace concentrations. CRD can be used in a wide range of research areas, such as trace-gas detection, atmospheric sensing, molecular spectroscopy, chemical kinetics studies, and condensed-phase characterization. The high sensitivity of CRD detection results at least in part from cavity-enhanced absorption (i.e., long absorption pathlength) and its immunity to laser intensity fluctuations, because the cavity light leak rate, instead of intensity, is measured using CRD methods. Detection sensitivity below $10^{-8}$ cm$^{-1}$ can be achieved, especially in the visible and near-IR regions, where high-reflectivity mirrors, sensitive detectors, and tunable radiation sources with sufficient output power are available. Recent advances in compact, room-temperature quantum cascade lasers (QCL) have pushed the application of the CRD techniques into the mid-IR spectral range. Chemical sensing capability in the mid-IR region is highly desirable, because strong, fundamental-band, rovibrational transitions typically lie in this so-called "molecular fingerprint region" between wavelengths of about 3-20 μm.

CRD detection has immunity to laser intensity fluctuations and has shot-noise-limited detection sensitivity. The presence of frequency- and time-dependent variations in the empty cavity decay rates prevents shot-noise-limited sensitivity in conventional, linear-absorption CRD measurements. The saturated-absorption cavity ringdown (SCAR) method has improved CRD detection sensitivity. For conventional CRD detection, power saturation is an undesirable effect, because a high level of saturation at the beginning of the ringdown leads to a non-exponential decay pattern. The SCAR method makes full use of power saturation and its resulting non-exponential decay to achieve simultaneous measurements of both the empty cavity ($\gamma_c$) and gas-absorption-induced ($\gamma_g$) ringdown rates. With the ability to decouple $\gamma_g$ from $\gamma_c$, the SCAR method significantly increases the sensitivity of CRD detection. For example, by measuring the $v_3$-fundamental, P(20) transition of $^{14}CO_2$ at 4.5 μm, the SCAR method achieves $^{14}C$ quantification at 5 parts-per-quadrillion (ppq, where quadrillion=$10^{15}$) $^{14}C/^{12}C$ level, which is ~60× lower than the minimum $^{14}C$ concentration measured by the conventional, linear-absorption-based CRD technique. While accelerator mass spectrometer (AMS) remains the most sensitive analytical tool for $^{14}C$ quantification (with sensitivity below 1 ppq), the relative simplicity and low cost of the disclosed mid-IR CRD detection (both linear and SCAR) makes it an attractive alternative $^{14}C$ quantification method to AMS, especially for biological applications, where detection sensitivity at ⅓ of $^{14}C$ modern concentration (400 ppq) is sufficient. The demonstration of the feasibility of CRD-based, $^{14}C$ quantification have spurred interest in the development of commercial, QCL-based, linear-CRD $^{14}C$ sensors.

In trace detection of polyatomic molecules, due to the high density of ro-vibrational transitions, the detection limit is determined by the detection sensitivity and the detection selectivity, i.e., the ability to detect the target transition in the presence of severe spectral overlaps with transitions from other molecular species. While SCAR detection allows for greater sensitivity over the conventional linear CRD techniques, it does not lead to improved selectivity, because SCAR detection is still based on one-photon absorption as the conventional CRD methods. For $^{14}C$ quantification with both linear and saturated-absorption CRD detection, due to the extreme scarcity of $^{14}CO_2$, even the high hot-band absorption signals (with lower level of the transition in the 5000 cm$^{-1}$ region) from $^{13}CO_2$ (1.1% natural abundance) are significantly stronger (by ~1000×) than the $^{14}CO_2$ fundamental transition signals at room temperature. To avoid severe spectral overlap with hot-band signals from $^{13}CO_2$ and $^{12}CO_2$, the CRD measurements of $^{14}CO_2$ need to be carried out at low temperatures, which are achieved either by placing the cavity inside a large freezer (250 K) or cryogenic cooling of the cavity with a Stirling engine (170 K). The cooling needs for the application of both linear and saturated-absorption CRD detection for $^{14}C$ quantification not only increase the engineering costs, but also make the CRD detection setup less field-deployable.

With the goal of improving the detection selectivity in a spectrally congested region, a resonance-enhanced, one-color, two-photon CRD detection scheme has been proposed, which has been recently implemented. Similar to the SCAR method, the proposed one-color, two-photon detection relies on the high intracavity laser power achieved with a cavity-locked laser. The one-color, two-photon CRD method allows for the decoupling of the desired two-photon-absorption-induced cavity decay rates from the combined exponential decay rates due to the empty cavity and one-photon absorptions from non-target molecular species. High sensitivity and high selectivity, room temperature trace detection is thus possible with this technique. However, the detection sensitivity of the one-color, two-photon CRD method is expected to be species-dependent. For mid-IR trace detection which takes advantage of strong $\Delta v=1$ ro-vibrational transitions, the efficiency of one-color, two-photon excitation relies on the existence of a pair of linked fundamental-band ($1\leftarrow 0$) and "hot-band" ($2\leftarrow 1$) ro-vibrational transitions with similar transition frequencies. If these two transition frequencies are sufficiently close, the transition probability of the overall, $2\leftarrow 0$, two-photon transition could be resonance-enhanced. For example, in the case of $^{12}CO_2$, the $v_3=1\leftarrow 0$, P(16) transition and the $v_3=2\leftarrow 1$, R(15) transition frequencies differ by 5.6 GHz. This means that the overall, $2\leftarrow 0$, Q(16) two-photon transition has a relatively small one-photon detuning of $$\frac{5.6}{2} \text{ GHz}.$$

In comparison, for one-color, two-photon detection of $^{13}CO_2$, the smallest one-photon detuning is nearly 21 GHz (for the 1-0, P(16) and 2-1, R(15) pair). Given that one-color, two-photon excitation probability is proportional to the inverse of the square of the one-photon detuning, the detection sensitivity of $^{13}CO_2$ could be more than an order of magnitude lower than that of $^{12}CO_2$. As a result of this inevitable species-dependent detection sensitivity, the one-color, two-photon CRD detection may not be a generalized mid-IR trace detection method.

Figure 1C:
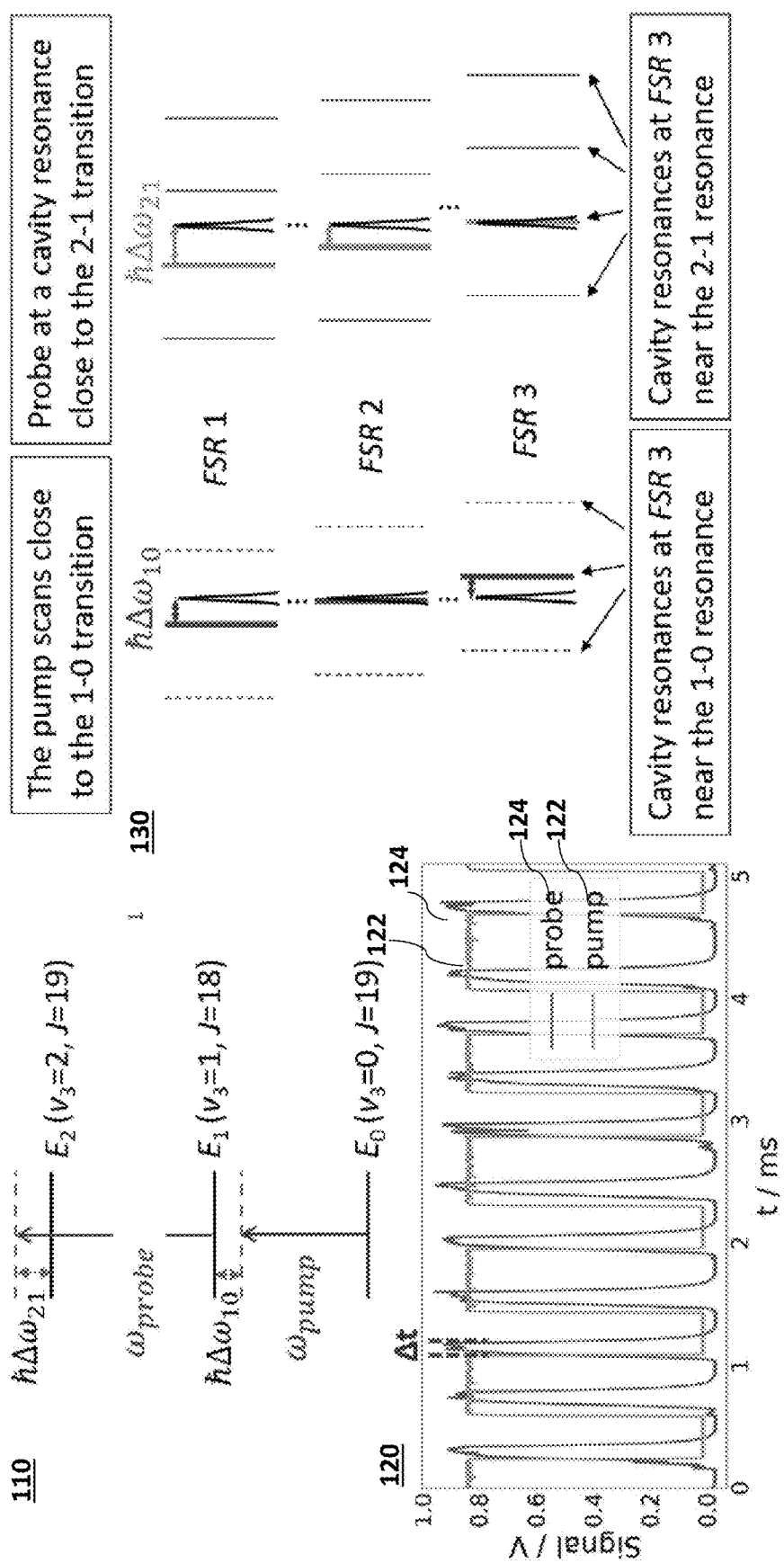
FIG. 1C shows example transitions and signals as a function of time.

A generalized detection scheme with both high sensitivity and selectivity is needed. Disclosed is such a scheme using two-color, intracavity pump-probe CRD detection using a three-mirror, traveling-wave cavity. In an example implementation, $N_2O$ is detected. The basic principles are illustrated in FIG. 1C. Counter-propagating pump and probe lasers are each frequency-locked, respectively, to a cavity resonance with frequency close to the $v_3=1\leftarrow 0$, P(19) and $v_3=2\leftarrow 1$, R(18) molecular transition frequencies (see FIG. 1C at 110 and at 130). A model (detailed below) is used to determine which specific pairs of pump-probe cavity resonances are used to observe two-color CRD signals. In an example experiment, the intracavity pump radiation (estimated to be 36 W at full) is switched off during every other probe ringdown event (FIG. 1C at 120). The difference between the pump-on and pump-off signals yields the net $N_2O$ two-color absorption. Since the pump-off signal contains information of both the empty cavity ringdown rates and background absorption from non-target molecular species, the net two-color CRD signals are, in principle, completely background-free. Unlike free-space, two-color excitation frequently applied in molecular spectroscopy, for intracavity two-color excitation, the pump and probe laser frequencies are each only allowed at a specific cavity resonance. As a result of this cavity resonance constraint, the probe laser frequency cannot be tuned independently of the pump because a change in the cavity free-spectral-range ($\mathcal{FSR}$) leads to a simultaneous shift in both the pump and probe frequencies (FIG. 1C at 130).

FIG. 1C shows example transitions and signals as a function of time. FIG. 1C at 110 depicts an example diagram that illustrates the interaction of a three-level-system with two laser radiation sources. The rotation-vibration assignments for the three levels of interest are given in the parentheses. $E_i$ is the energy of level i (i=0-2). $\omega_{pump}$ and $\omega_{probe}$ are, respectively, the angular frequencies of the pump and probe lasers. $\Delta\omega_{10}$ and $\Delta\omega_{21}$ are, respectively, the pump and probe detuning frequencies from the corresponding molecular transition frequencies (see Eq. (2) for the definitions). FIG. 1C at 120 shows an example of pump 122 and probe 124 laser signals, obtained with the 1:1 pump switching scheme. At gives the delay between the pump shut-off time and the start of the probe ringdown (see below). FIG. 1C at 130 shows a diagram of some of the basic principles of the pump and probe frequency scanning scheme. The vertical lines represent the cavity resonances at three different cavity $\mathcal{FSR}$ values. Each $\mathcal{FSR}$ corresponds to a specific cavity length. For illustration purposes, the pump and probe lasers in FIG. 1C at 130 are frequency-locked, respectively, to cavity resonances indicated by the thick red and orange bars. An increase in the cavity $\mathcal{FSR}$ leads to a simultaneous increase in both the pump and probe frequencies (i.e., the vertical bars move to the right as the $\mathcal{FSR}$ increases from 1 to 3).

Previously, two-color excitation has not been widely applied with cavity-enhanced techniques. The disclosed pump-probe scheme utilizes a pair of strong, $\Delta v=1$, mid-IR rovibrational transitions. In some example embodiments, the pump power is cavity-enhanced. In addition, the near-IR probe can be tuned independently from the pump laser. In some example embodiments, the pump and probe lasers (1.6 µm) are simultaneously coupled into a high-finesse (F~100000) cavity. In previous work, $CO_2$ has been used which has transition dipole moments more than 20× weaker than the $N_2O$ ro-vibrational transitions used in the example described here. The pump transition in the disclosed example two-color detection is strongly power-broadened (FWHM~300 MHz), and as a result, the pump radiation excites the entire Doppler-profile with essentially equal probabilities.

The disclosed intracavity ladder-type pump-probe scheme which utilizes strong mid-IR 1-0 (pump) and 2-1 (probe) ro-vibrational transitions is ideal for high-sensitivity and high-selectivity trace-gas detection. Given that the 1-0 and 2-1 ro-vibrational transitions typically have similar transition frequencies, both the pump and probe radiation are cavity-enhanced. With a high intracavity pump power (36 W), the fundamental-band transition (~0.1 Debye transition dipole) is easily saturated. At the same time, the detection sensitivity is greatly enhanced because of the long effective absorption pathlength for the probe (7.1 km). Due to the presence of strong intracavity pump radiation, effects from strong light-molecule interactions, such as power broadening and light shifts, become important in our pump-probe scheme. These effects are treated by three-level system density-matrix formalism, which is solved under the cavity resonance constraints (see below). The disclosed model suggests that with a strongly saturated pump transition, the two-color signals based on our pump-probe scheme are as strong as the signals from conventional, one-color detection of the mid-IR, fundamental-band transitions. Even though the pump can only excite maximally half of the population into the intermediate level, this "loss" in the population is largely compensated by the fact that the 2-1 probe transition probabilities are higher than those of the 1-0 transition (by a factor of two in the harmonic oscillator limit). For both $N_2O$ and $CO_2$, for example, the transition probabilities of $v_3$=2-1 are close to 1.9× larger than those of $v_3$=1-0.

Room-temperature CRD-detection-based quantification of sub-modern $^{14}CO_2$ samples is an example motivation for the development of the disclosed two-color CRD detection, but the potential use of the technique is not limited to trace-gas detection. Using widely-tunable and high-power mid-IR radiation sources, the disclosed intracavity pump-probe detection can be applied for quantum-state-resolved measurements of vibrationally excited states of large and non-volatile molecular species, for which experimental challenges due to spectral congestion and low gas-phase density call for the use of high sensitivity and high selectivity detection methods.

Experimental Details

Figure 2:
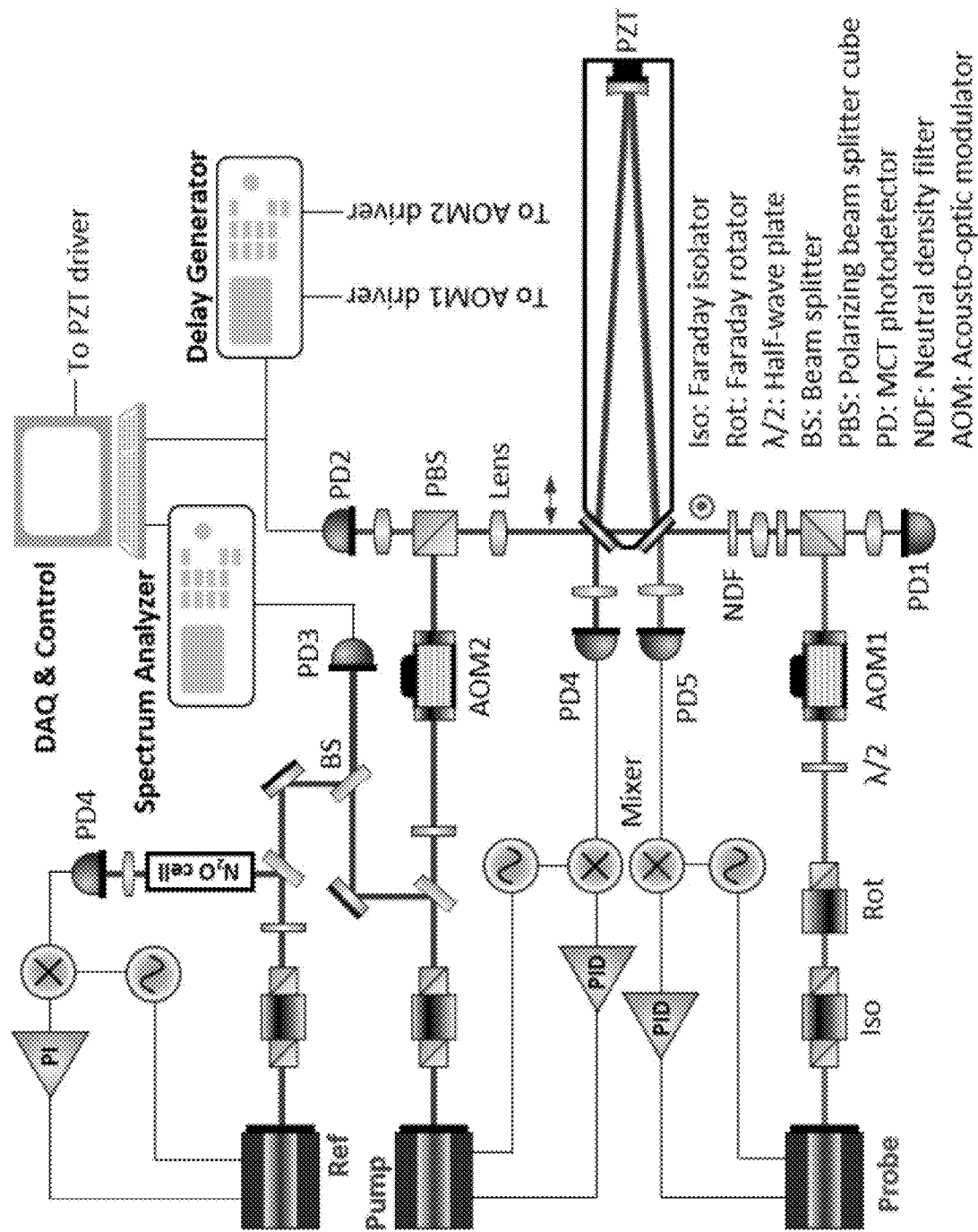
FIG. 2 shows a schematic diagram of an example system.

A schematic of an experimental setup is shown in FIG. 2. Some components shown in FIG. 2 including the delay generator and spectrum analyzer may not be included in an operational system. In the example shown in FIG. 2, a three-mirror traveling-wave cavity with a total nominal round trip length of 66 cm is shown that includes two plano mirrors and a plano-concave mirror with 1-m radius of curvature (e.g., LohnStar). The two plano mirrors were glued directly onto an invar cavity spacer. The concave mirror is housed in a piezoelectric-transducer (PZT) assembly which is attached to the invar spacer. The laser incidence angle at the PZT mirror is ~1.5°. Two continuous-wave (cw) distributed feedback quantum cascade lasers (QCL) (e.g., Hamamtsu HHL-package), labeled as "Pump" and "Probe" in FIG. 2, are coupled into the traveling-wave cavity in a counter-propagating configuration. The pump laser is p-polarized, and the probe s-polarized with respect to the cavity. Since the two plano cavity mirrors have higher reflectivity for s- vs. p-polarization, the cavity has a higher finesse for the probe than the pump. The s-mode probe ringdown time was measured to be about 23.7 μs (with finesse of F=67700), and the p-mode pump ringdown time is about 1.85 μs (F=5280). With two polarizing beam splitter cubes (e.g., Electro-Optics Technology), the two counter-propagating, orthogonally-polarized laser beams can be easily separated and individually detected. Both pump and probe QCLs can be frequency-locked to the cavity using the Pound-Drever-Hall (PDH) method. Specifically, for each laser (modulated at 6 MHz), light reflection off the cavity is measured with a HgCdTe (MCT) photodetector (PD4/PD5 in FIG. 2, e.g., Thorlabs PDAVJ8), and the MCT signal is demodulated with a frequency mixer (e.g., Mini-Circuit, ZRPD-1+). The resulting error signal is used as the input to the PID servo control loop (e.g., Vescent D2-125-PL) to achieve laser frequency-locking to the cavity. The PDH-locking bandwidth is ~1 MHz for both s- and p-mode.

FIG. 2 shows an example of an experimental setup. Three QCLs are labeled as "Pump," "Probe," and "Ref." The counter-propagating pump and probe are coupled into the ring-cavity for the two-color CRD measurements, and their respective polarizations are indicated by the arrow and dot symbols. The ref laser, which is frequency-locked to the $N_2O$ 1-0, P(19) transition, serves as the frequency reference. See text for more details about the experimental setup.

The probe laser beam is detected by another MCT photodetector (PD2 in FIG. 2, VIGO PVI-3TE-6/MI PDC-F-20). A small portion of the MCT output is sent to a delay generator (e.g., Stanford Research System DG645), which sends a trigger to AOM1 (e.g., IntraAction) to initiate the probe ringdown when the MCT signal reaches a preset threshold. The remaining MCT signal is digitized on a 24-bit oscilloscope (e.g., National Instrument PXI-5922). To measure the background cavity ringdown rates, the intracavity pump power is switched off after every other probe ringdown event. This 1:1 pump switching sequence is achieved with a separate output channel of the delay generator to control AOM2 (e.g., IntraAction). The delay between the pump shut-off and the start of the probe ringdown can be varied. FIG. 1C at 120 shows both the pump 122 and probe 124 signals, where a 250-μs-long signal is recorded for each probe ringdown event and a pump-probe delay (Δt) of 100 μs is used. As can be seen in FIG. 1C at 120 sustained intracavity pump power is achieved with ~0.5% intensity fluctuation. A sustained and stable intracavity pump power is crucial for the success of our two-color detection scheme. A large pump-probe delay (Δt>100 μs) is used, especially at low pressure (e.g., 2.6 torr), to avoid exciting (small) residual populations in the pump-populated $v_3$=1, J=18 level after the intracavity pump power is shut off by AOM2 (see below). By using a 250-μs ringdown data collection window and Δt=100 μs, probe ringdown acquisition rates of ~2 kHz are achieved. The difference between the "Pump-on" and "Pump-off" signals yields the background-free, two-color $N_2O$ signal. As illustrated in FIG. 1C at 130, with the pump and probe each frequency-locked to a specific cavity resonance close to, respectively, the 1-0 and 2-1 molecular transition frequencies, the two laser frequencies are simultaneously tuned by changing the cavity $\mathcal{FSR}$, which is achieved by adjusting the PZT voltage. For all the spectra in this work, at each PZT position, 1-s of ringdown events are recorded and analyzed.

To minimize power saturation of the probe transitions while maintaining near-maximum signal at the detector (~0.8 V), the s-mode laser beam is attenuated with neutral density filters (with total OD=1.2) prior to being coupled into the cavity. However, even with this attenuated probe laser beam, signs of power saturation can be seen in the ringdown traces (i.e., non-exponential decay), particularly at the early part of the ringdown signals at low pressure (2.6 torr). To further minimize saturation at low pressure, the starting point of the exponential ringdown fit can be chosen to be 50 μs (~2× ringdown-time) later than the start of probe ringdown. The intracavity s-mode power is estimated to be equivalence of 0.2 W at the beginning of the ringdown fit. The cw intracavity p-mode power is ~36 W.

In some example embodiments, the cavity can be mounted on an optical table, without active compensation of ambient perturbations (e.g., acoustics, temperature, pressure). In the presence of a small gas leak in the cavity mirror epoxy (~1 mtorr/min), the measurements can be taken under the gas flow-through condition, which does not noticeably degrade laser locking performance. The successful implementation of two-color CRD measurements under these noisy experimental conditions demonstrates the potential of the technique for future field-work applications. In the example setup, the cavity pressure is controlled with a needle valve located near the gas inlet of the cavity, which is evacuated by a turbo pump. Ultra-high-purity $N_2$ is used for the measurements. In the flow-through setup, the $N_2O$ concentration derives from the established equilibrium between the flow-through cavity and the ambient air (~330 ppb $N_2O$). The $N_2O$ concentration (down to 0.1 ppb level)

inside the cavity can be varied by adjusting a combination of the needle-valve opening, the head pressure at the valve, and the pump rate. The $N_2O$ concentration used for a given two-color CRD measurement is determined by directly measuring the one-photon CRD signal of the 1-0, P(17) transition at 2208.5751 $cm^{-1}$. The one-photon CRD signal is fitted using both the conventional exponential decay fit (to the late-gated signal) and the SCAR method (with fixed value for the initial saturation parameter. The average value of the $N_2O$ concentration determined from these two fitting methods (and their difference) is described here.

The experimental components associated with the third laser (labeled as "Ref" in FIG. 2) are used for the calibration of the pump and probe laser frequencies. Specifically, this third QCL (e.g., Hamamtsu HHL-package) is frequency-modulated at 1.7 MHz, and passes through a static cell with 7.2 torr of 0.01% $N_2O$ in $N_2$. The Ref laser is locked to the $N_2O$ 1-0, P(19) transition by a PI servo loop (e.g., New Focus LB1005). As the pump laser frequency is scanned in the vicinity (±0.85 GHz) of the same $N_2O$ 1-0 transition, the beatnote between pump and ref QCLs provides a sufficiently accurate (±0.5 MHz with 1-s averaging) pump detuning frequency measurement ($\Delta\omega_{10}$). The beatnote signal is measured by a fast MCT detector (e.g., VIGO) and recorded on a spectrum analyzer (e.g., Rhode & Schwartz). The pump laser frequency can be determined from the measured pump detuning value and the $N_2O$ 1-0, P(19) transition frequency. The calibration of the probe laser frequency requires additional measurements of cavity properties, such as the cavity $\mathcal{FSR}$ (described below).

For an ideal three-mirror ring-cavity, a given cavity p-mode resonance is located half-way between the two closest s-mode resonances, because of the net π phase-shift difference between the two polarizations upon mirror reflections at non-normal incidence angles. In comparison, the two polarization modes are degenerate in a linear, Fabry-Perot cavity. Furthermore, as a result of additional (small) differential phase shifts between s- and p-polarized light upon interaction with the mirror coatings, the p-mode resonance frequencies in a typical ring-cavity do not lie exactly mid-way from the two neighbouring s-mode resonance frequencies. This displacement, $\delta v_{sps}$, can be defined to be the difference of the p-resonance frequency from the average frequency of two adjacent s-resonances. From the beatnote measurements between multiple pairs of PDH-locked p- and s-mode transmitted light with frequency difference <2 GHz, both the cavity $\mathcal{FSR}$ and $\delta v_{sps}$ values can be determined with sub-kHz accuracy. At zero PZT voltage, $\mathcal{FSR}$ =443.3686 MHz, and $\delta\omega_{sps}$=+32.5954 MHz. Together with the $\omega_{pump}$ value derived from the pump detuning measurement, the probe laser frequency can be determined by, $$\omega_{probe}/2\pi=(\omega_{pump}/2\pi-\delta v_{sps}+\mathcal{FSR}/2)+n\mathcal{FSR} \quad \text{Eq.(1)}$$

where n is an integer. With the probe laser frequency measurement provided by the wavemeter (e.g., Bristol 771) (10 MHz accuracy), n can be determined unambiguously (n=97–99 for our pump-probe scheme). With this probe laser frequency and the 2-1, R(18) transition frequency from HITRAN, the probe detuning frequency can be determined to the accuracy of the HITRAN values (~10 MHz). Small change in the $\mathcal{FSR}$ value ($\Delta\mathcal{FSR}$ <7 kHz) during a 0.85 GHz pump/probe frequency scan is neglected in calculating the probe laser frequency, since the error introduced by this simplification (n$\Delta\mathcal{FSR}$) is smaller than the expected probe frequency calibration error (~10 MHz). The pump and probe laser frequency calibration procedures could be simplified in the future with the use of a mid-IR frequency comb as a frequency reference.

Simulation Model

For the three-level system considered here (FIG. 1C at 110), the 1-0 and 2-1 transition frequencies differ by ~1.5 $cm^{-1}$. Given that each laser is in near-resonance with only one of the two transitions, the effects of cross-excitation, e.g., the pump exciting the 2-1 transition, are neglected. With the one-photon pump and probe detunings defined, respectively, as $$\hbar\Delta\omega_{10}=\hbar\omega_{pump}-(E_1-E_0)$$

$$\hbar\Delta\omega_{21}=\hbar\omega_{probe}-(E_2-E_1), \quad \text{Eq.(2)}$$

the time-evolution of the density matrix elements (under the rotating-wave approximation) are given by the following system of differential equations, $$-\dot\rho_0=\gamma_0(\rho_0-1)+i\Omega_{10}(\rho_{01}-\rho_{10})$$

$$-\dot\rho_1=\gamma_1\rho_1+i\Omega_{10}(\rho_{10}-\rho_{01})+i\Omega_{21}(\rho_{12}-\rho_{21})$$

$$-\dot\rho_2=\gamma_2\rho_2+i\Omega_{21}(\rho_{21}-\rho_{12})$$

$$-\dot\rho_{01}=i\Omega_{10}(\rho_0-\rho_1)+(\gamma_{10}+i\Delta\omega_{10})\rho_{01}+i\Omega_{21}\rho_{02}$$

$$-\dot\rho_{20}=i\Omega_{21}\rho_{01}+(\gamma_{20}+i\Delta\omega_{20})\rho_{02}-i\Omega_{10}\rho_{12}$$

$$-\dot\rho_{12}=i\Omega_{21}(\rho_1-\rho_2)+(\gamma_{21}+i\Delta\omega_{21})\rho_{12}+i\Omega_{20}\rho_{20}$$

$$\rho_{01}=\rho_{10}^*, \rho_{20}=\rho_{02}^*, \rho_{12}=\rho_{21}^*, \quad \text{Ep.(3)}$$

where $\rho_i$ gives the population in level i (i=0–2) and $\rho_{ij}$ gives the coherence between level i and j. Furthermore, E gives the electric field amplitude at the position of the molecule; $\omega_{20}=\omega_{10}+\omega_{21}$ is the two-photon detuning; $\Omega_{10}=\mu_{10}$ E/2ℏ and $\Omega_{21}=\mu_{21}$ E/2ℏ are, respectively, half of the Rabi frequency of the 1-0 and 2-1 transition, with corresponding electric transition dipole moment, $\mu_{10}$ and $\mu_{21}$, $\gamma_i$ is the population decay rate for level i, and $\gamma_{ij}$ is the coherence decay rate between level i and j. Note that the pump and probe detuning frequencies given by Eq. (2) are the negative values of how these two detunings are typically defined in the literature, e.g., the one-photon pump detuning is conventionally defined as $(E_1-E_0)-\hbar\omega_{pump}$. With our alternative definitions, the pump/probe detuning value increases as the laser frequency increases, which is natural when the spectrum is shown as a function of these detunings. A positive/negative detuning now corresponds to blue/red detuning. Given that the cavity-decay time (23.7 μs) is much longer than the collisionally-induced dephasing time (~100 ns at 1 torr, the lowest pressure used in our experiment), the system is assumed to have reached and remain in the steady state throughout the probe ringdown. As a result, the time-derivatives on the left-hand-side of Eq. (3), $\dot\rho_i$ and $\dot\rho_{ij}$, are set to zero. The two-color excitation signals are taken to be proportional to $\rho_2$, the steady-state population in level 2.

With the constraints on the pump and probe frequencies given by Eq. (1), the two-color excitation spectra for a given set of 1-0 and 2-1 molecular transitions are simulated by solving Eq. (3) with an array of cavity $\mathcal{FSR}$ values. The smallest $\mathcal{FSR}$ value in our simulation is set to the measured $\mathcal{FSR}$ at zero PZT voltage. The p-mode displacement parameter, $\delta v_{sps}$, which has also been measured at zero PZT voltage, increases proportionally to $\mathcal{FSR}$, i.e., $\delta v_{sps}/\mathcal{FSR}$ is a constant. In the simulation, the pump radiation can be set to follow a p-mode cavity resonance with frequency detunings in the range of ±850 MHz from the 1-0 transition frequency. An example simulation shows that regardless of the pump-probe transition frequencies, the two-color excitation signals can be observed at some pump detunings if the probe signals are recorded for one of the s-mode cavity resonances with an initial probe frequency detuning in the range of approximately $\pm\mathcal{FSR}$, at the beginning of the frequency scan.

To take into account the Doppler-broadening effects (FWHM=120 MHz at 300 K for $N_2O$), at each $\mathcal{FSR}$ value, the $\rho_2$ values for various Doppler velocity sub-groups are numerically integrated. In the example simulation, 200 sub-groups spanning ±250 MHz of Doppler detunings are included. The Doppler effects produce different combinations of pump and probe detunings for each of the Doppler sub-groups. For each velocity sub-group, the Doppler-induced pump and probe detunings are of similar magnitude but opposite sign, because of the closeness of the pump and probe laser frequencies and the counter-propagating beam configurations. This (near-)perfect Doppler cancellation is the basis for the observation of Doppler-free, two-photon transitions. With the use of a strong pump, we observe, in addition to these narrow Doppler-free transitions, Doppler-broadened two-color transitions (see below).

In the example simulations, the air-broadening coefficients for $N_2O$ (HWHM=3 MHz/torr for both 2-1 and 1-0) are used to calculate $\gamma_{10}$, $\gamma_{21}$, and $\gamma_{20}$. A probe half-Rabi-frequency of $$\frac{\Omega_{21}}{2\pi} = 1$$

MHz is urea in our simulation to allow for probe power saturation. The pump half-Rabi-frequency, $\Omega_{10}$, and the population decay rate, $\gamma$ (which is assumed to be the same for all three levels), are adjusted to match the observed two-color spectra. Note that each of the three levels involved in our excitation scheme has (2J+1)-fold degeneracy, due to the presence of magnetic sub-levels (m sub-levels). The transition dipole moments are m-dependent. As a result, technically, the two-color spectra should be calculated for each m sub-levels involved in the transition scheme. However, the calculations which explicitly take into account m-dependent transition dipole moments are not necessary to reproduce key spectroscopic features observed in the two-color spectra. For simplicity, a single effective value is used for each of the $\Omega_{10}$ and $\Omega_{21}$ parameters. Effects on the Rabi-frequencies from the Gaussian radial beam profile and variations of the beam radius along the cavity longitudinal direction are also incorporated into these effective $\Omega_{10}$ and $\Omega_{21}$ values. To summarize, the following set of values are used in the simulation of the observed $N_2O$ two-color spectra: $\gamma_{10}/P=\gamma_{21}/P=\gamma_{20}/P=2\pi\times3$ MHz (where P is the pressure in torr), $\gamma/P=2\pi\times30$ kHz, $\Omega_{10}=2\pi\times25$ MHz, and $\Omega_{21}=2\pi\times1$ MHz. As discussed in below, to reproduce key spectroscopic features observed in the two-color CRD spectra (in particular, the relative intensities between the Doppler-free and Doppler-broadened peaks), the simulation model requires the population decay rates to be significantly slower than the coherence decay rates. For a given ro-vibrational transition, these two types of collision-induced rates are generally expected to be similar. The unusually slow population decay rates inferred from the simulation may be an artifact of the phenomenological treatment of collisional relaxations by Eq. (3) (see further description below). The simulation model described provides accurate predictions of the pump and probe frequencies for observing two-color resonances in a cavity. In addition, it provides physical insights to the appearance of the observed two-color spectra, as shown below. A comprehensive model that accurately treats the collisional effects is not required for the application of our two-color CRD detection.

Spectroscopic Features in the Two-Color Spectra

Figure 3:
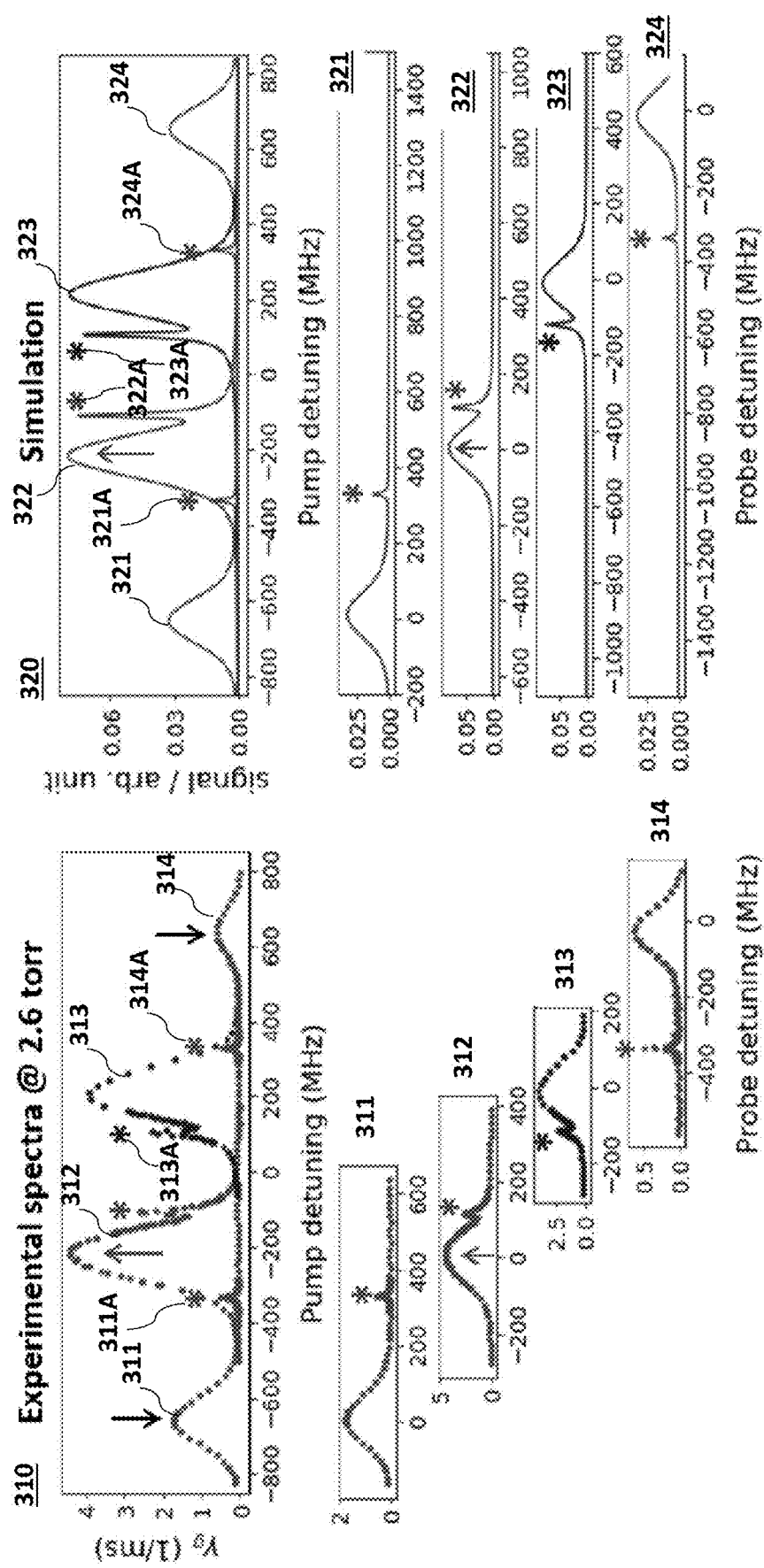
FIG. 3 shows examples of experimental and simulated two-color cavity ring-down (CRD) spectra taken at 2.6 torr.
Figure 4:
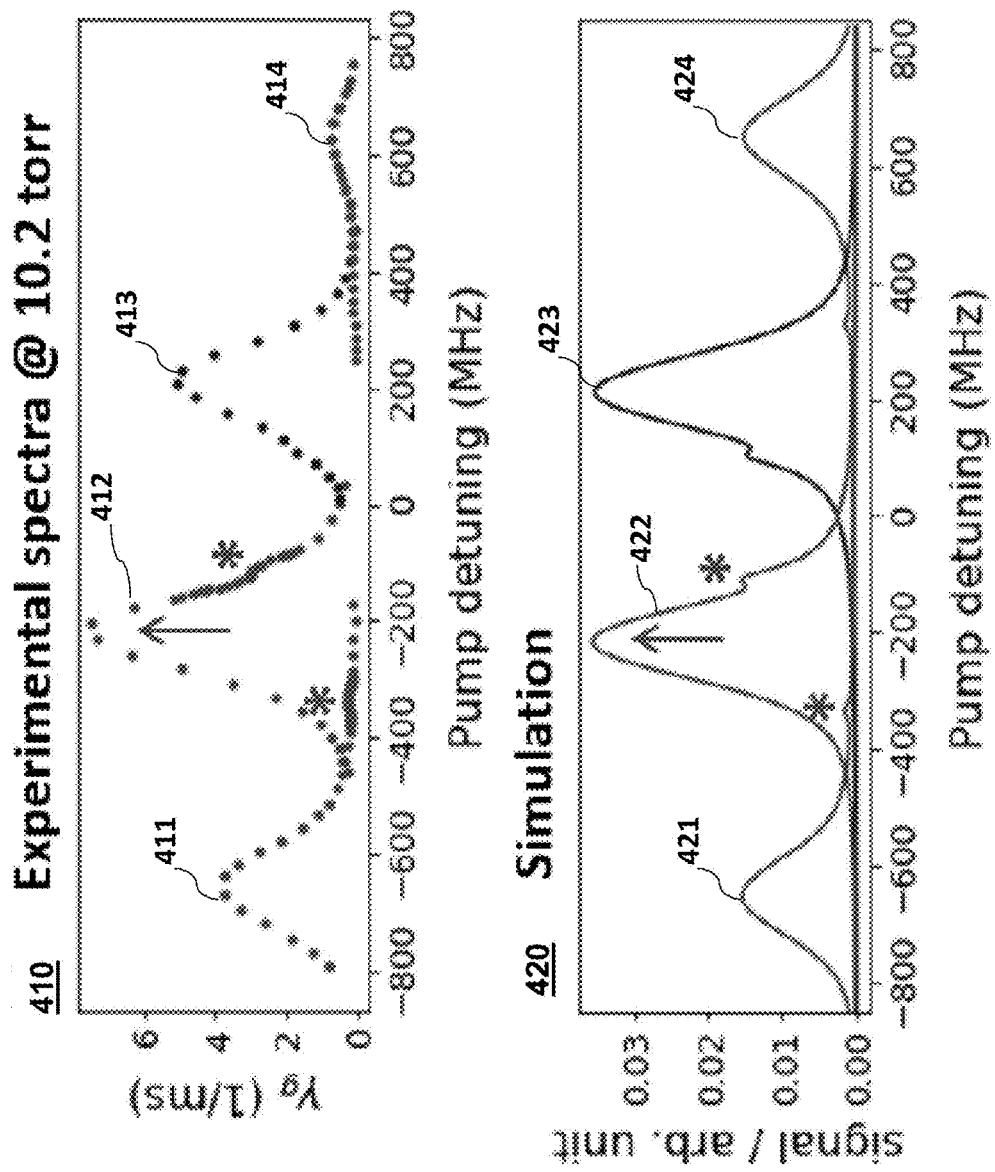
FIG. 4 shows examples of experimental and simulated two-color CRD spectra taken at 10.2 torr.

According to the simulation based on the pump-probe scheme (FIG. 1C at 110), with pump detunings in the range of ±0.85 GHz, two-color pump-probe signals can be observed in four separate frequency scans, in which the pump and probe lasers are frequency-locked to four different pairs of p- and s-mode cavity resonances with frequencies close to the corresponding target molecular transitions (see the illustrations in FIG. 1C at 130, in which the pump and probe are locked to one such pair of p- and s-mode cavity resonances). These four two-color spectra are shown in FIG. 3 at 310 (311, 311A, 312, 312A, 313, 313A, 314, 314A) and FIG. 4 at 410 (411, 412, 413, 414) for measurements taken at 2.6 and 10.2 torr, respectively. The numerically simulated spectra at these two pressures are shown in FIG. 3 at 320 (321, 321A, 322, 322A, 323, 323A, 324, 324A) and FIG. 4 at 420 (421, 422, 423, 424). For both sets of experimental spectra, the signals correspond to the background-free, two-color, $N_2O$-induced ringdown rates ($\gamma_g$). In the two upper panels of FIG. 3 at 310 and 320 (experiment and simulation at 2.6 torr), the four two-color spectra are overlayed and shown together as a function of the pump detunings. In the bottom four panels, these four spectra are shown individually as a function of the probe detunings. In FIG. 4 (for experiments at 10.2 torr), the overlayed, pump-detuning spectra are shown. Each two-color peak in FIG. 4 occurs at the same probe detuning frequency as its corresponding peak in FIG. 3, e.g., the peaks indicated by the upward-pointing arrows in FIG. 3 at 310 and FIG. 4 at 410 both occur at close to zero probe detuning. To avoid redundancy, the probe-detuning spectra at 10.2 torr are not shown in FIG. 4.

FIG. 3 shows examples of experimental and simulated two-color CRD spectra taken at 2.6 torr. FIG. 3 at 310 and 320 in the two upper panels show four overlayed, two-color spectra as a function of the pump detunings. Each of the four lower panels shows the individual two-color spectrum as a function of the probe detunings. The $N_2O$ concentration is 32.3±0.1 ppb. The observed asymmetry in intensities between red- and blue-pump-detuned peaks (e.g., between the peaks indicated by downward-pointing arrows at 310), which are not reproduced by our simulations, are discussed below. In FIG. 3, the asterisks (*) correspond to the coherent peaks and the arrows correspond to the step wise peaks.

FIG. 4 shows examples of experimental and simulated two-color CRD spectra taken at 10.2 torr. Four two-color spectra are overlayed and shown together as a function of the pump detunings. The $N_2O$ concentration is 12.4±0.8 ppb.

There are two qualitatively different types of two-color resonances observed in some experiments, as can be seen in the low-pressure spectra (FIG. 3). The narrow, Doppler-free, two-color resonances (four such resonances with FWHM of ~15 MHz are indicated by the asterisks in FIG. 3) occur at pump and probe detunings that are equal in magnitude (subject to AC Stark shift of ~1 MHz) but opposite in sign. As explained below, these sharp resonances occur due to the counter-propagating pump-probe configuration. The intermediate $v_3=1$ level is not populated during this coherent excitation scheme, i.e., a Raman-type process that goes through a virtual intermediate state. Note that, due to pressure broadening, the Doppler-free resonance peaks (e.g., the two peaks indicated by the asterisks in FIG. 4) show up only weakly at 10.2 torr. In addition to these Doppler-free two-color resonances, we observe strong Doppler-broadened features in our two-color spectra (e.g., the peaks indicated by the upward-pointing arrows in FIGS. 3 and 4). These broad features always occur at nearly zero probe detuning (but different pump detunings). According to our simulation, these Doppler-broadened features result from a two-step excitation, 2←1←0. The intermediate $v_3=1$ level is first physically populated by the pump laser at some detuning value. At that particular detuning, if the probe laser frequency (constrained by Eq. (1)) is close to the 2-1 resonance frequency (e.g., within the 2-1 Doppler full width half maximum (FHWM)), the 2←1 excitation then occurs. Note that the two peaks indicated by the downward-pointing arrows in FIG. 3a occur, respectively, at pump detunings of −655 MHz and +635 MHz, both of which are well outside the 1-0 Doppler FWHM (120 MHz). As a result, the intermediate $v_3=1$ level must be populated through strong power-broadening of the 1-0 transition. Since all the Doppler velocity sub-groups are simultaneously populated by the strong pump with nearly equal probabilities at all pump-detunings, the Doppler compensation that occurs for the two-photon, Raman-type excitation no longer applies for the 2←1←0 two-step excitation. In the following discussions, the narrow two-photon peaks are referred to as the coherent two-quantum resonances, and the Doppler-broadened two-photon peaks as stepwise resonances.

Figure 5:
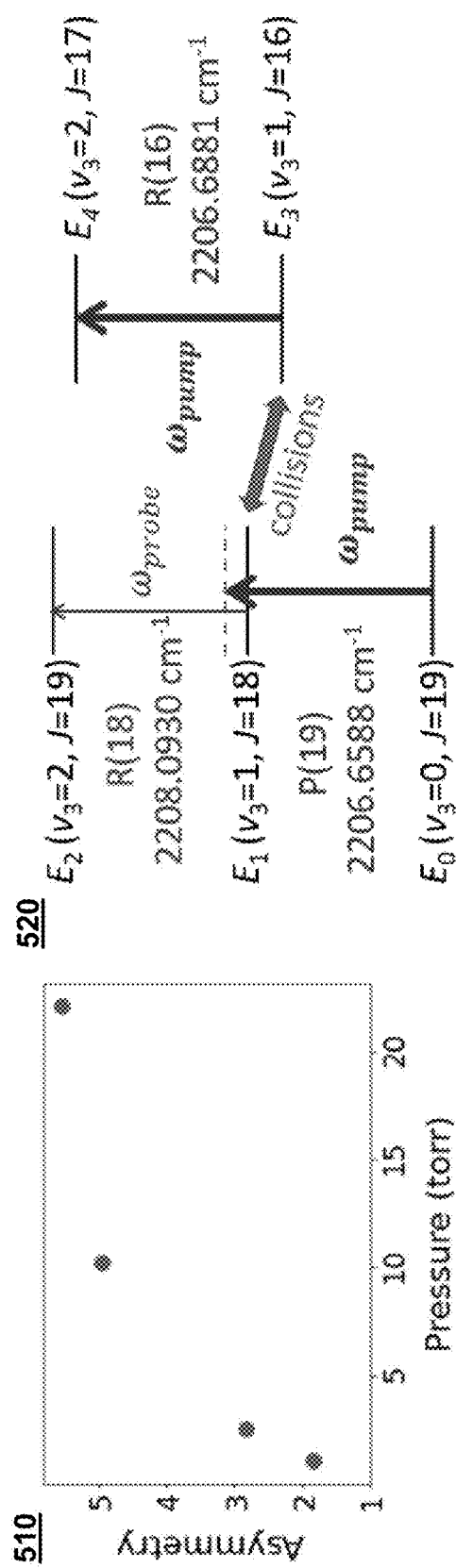
FIG. 5 shows aspects of the origin of a red/blue asymmetry.

As can be seen in our simulations in FIG. 3 at 320 and FIG. 4 at 420, the model successfully reproduces the co-existence of these two types of resonances. However, the observed asymmetry between the red- vs. blue-detuned step-wise resonances with similar magnitude of pump-detuning (but opposite in sign) is not reproduced, e.g., the Doppler-broadened peak at −655 MHz pump detuning in FIG. 3 at 310 is more than twice the intensity of the Doppler-broadened peak at +635 MHz (these two step-wise resonances are indicated by the downward-pointing arrows in the top panel of FIG. 3 at 310). The degree of asymmetry increases as pressure increases, as can be seen in FIG. 5 at 510, where the intensity ratios between the −655 MHz and +635 MHz pump-detuned peaks are shown at four pressures. For the narrow, coherent two-quantum peaks, the asymmetry is not observed, e.g., the blue-detuned peak indicated by the magenta asterisk in FIG. 3 at 310 is of about the same intensity as the corresponding red-detuned peak indicated by the red asterisk, in agreement with our simulation.

FIG. 5 shows aspects of the origin of the red/blue asymmetry. FIG. 5 at 510 shows the asymmetry, defined as the ratio of the −655 MHz and +635 MHz pump-detuned peak intensities, is shown as a function of pressure. FIG. 5 at 520 shows a level diagram which includes the collision-assisted excitation of the 2-1, R(16) transition by the pump radiation. Collision-induced population transfer between the $v_3=1$, J=18 level and the $v_3=1$, J=16 level is indicated by the two-headed arrow. Note that the pump radiation is in resonance with the 2-1, R(16) transition when it is +890 MHz blue-detuned from the 1-0, P(19) transition.

The observed red/blue asymmetries among the step-wise, two-color resonance peaks were not present in the simulations due to two limits of the model described above: the assumption of a three-level system and the treatment of collisional relaxation. In the three-level-system model (FIG. 1C at 110), the pump laser is assumed to excite only the 1-0, P(19) transition (2206.6589 cm$^{-1}$). In reality, the pump radiation, when it is +890 MHz blue-detuned from this target 1-0, P(19) transition, is inadvertently on-resonance with the 2-1, R(16) transition (2206.6881 cm$^{-1}$). Facilitated by efficient collisional population transfer from the initial, pump-populated $v_3=1$, J=18 level to the $v_3=1$, J=16 level, the 2-1, R(16) transition can be excited by the pump radiation, even though it does not share a common level with the 1-0, P(19) pump transition (see FIG. 5b). The excitation probability for the 2-1, R(16) transition is highest when the pump radiation is +890 MHz blue-detuned from the 1-0, P(19) pump transition. This "dual"-excitation for a blue-detuned pump may be the origin of the observed red vs. blue asymmetry, and is unique to the particular N$_2$O pump-probe scheme in the experimental setup. For the coherent two-quantum peaks, since the $v_3=1$ level is not directly populated, these Doppler-free peaks are not expected to be significantly affected by this additional light-assisted collisional pathway out the physical $v_3=1$ level, in agreement without experimental observations (i.e., the absence of red vs. blue asymmetry among the Doppler-free peaks). Given that a comprehensive, precise model is not needed for the application of our two-color CRD detection method and that the asymmetry is not believed to be a general feature of two-color excitation, only simulations from the basic model are used in FIG. 3 at 320 and FIG. 4 at 420. Results from the five-level simulation are shown below, along with further evidences which support the hypothesis regarding the origins of the observed asymmetry (i.e., the observation of collision-induced, 2-1, R(19) transition).

Background Compensation Capability

Figure 6:
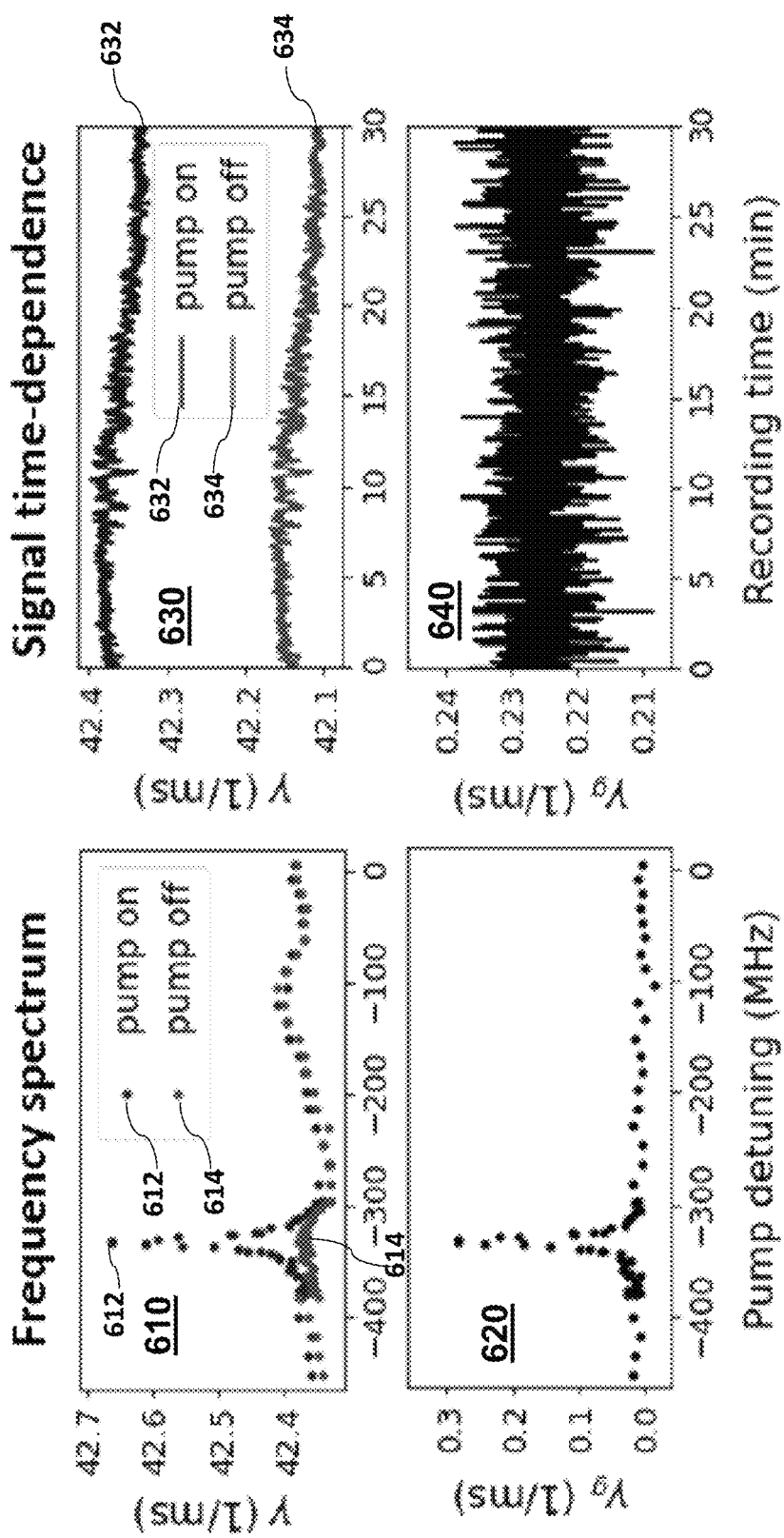
FIG. 6 shows examples of a background compensation capability for two-color spectra taken at 2.6 torr.

The background compensation capability of the two-color detection with the 1:1 pump switching is shown in FIG. 6. In FIG. 6 at 610, both pump-on and pump-off spectra are shown in the vicinity of a coherent, two-quantum resonance (2.6 torr). Note that the intensity of this Doppler-free, two-color peak (the same peak as indicated by the red asterisk in FIG. 3 at 310) is more than ten times weaker than that of the strongest stepwise, two-color peak observed under the same pressure (indicated by the upward-pointing arrow in FIG. 3 at 310). The combination of the weak peak intensity and narrow linewidth of this coherent, two-quantum resonance allows a clear demonstration of the frequency-domain background compensation capability of the technique. As can be seen in FIG. 6 at 610, frequency-dependent background wiggles (e.g., the hump near −100 MHz pump detuning) show up in both the pump-on and pump-off spectra. The difference between these two spectra (FIG. 6b) gives the N$_2$O-induced, two-color spectrum which is free of these large background fringes. The residual noise in the baseline of FIG. 6 at 610 can be reduced by longer averaging (1-s averaging is used to record the spectrum in FIG. 6 at 610). In addition to accounting for frequency-dependent empty-cavity decay rates, the time variations of the decay rates are corrected by our two-color detection scheme. In FIG. 6 at 630 and 640, the two-color signals (30 torr) at the top of the Doppler-broadened feature with +200 MHz pump detuning are shown over a 30-min. period. In the experimental setup, neither the cavity pressure nor temperature is actively stabilized. To avoid significant laser frequency drift due to the cavity length change (as a result of the pressure and temperature variations), the cavity is loosely locked (±2 MHz tolerance) to the 10-s running average of the desired molecular beatnote. As can be seen in FIG. 6 at 630, the 1:1 pump switching method allows cancellation of both the short-term variations in the empty-cavity decay rates (e.g., the small spikes in FIG. 6 at 630), and the relatively long-term drift (e.g., the slow drift down). The net two-color signals (FIG. 6 at 640) are relatively flat as a function of time.

FIG. 6 shows examples of the background compensation capability for two-color spectra collected at 2.6 torr. The spectrum shown in FIG. 6 at 620 shows the net two-color signals, i.e., the difference between the pump-on and pump-off signals in 610 (612, 614). FIG. 6 at 630 (632, 634) and 640 show time variations of the cavity ringdown rates (at 30 torr, with 0.15 ppb $N_2O$ concentration). The net two-color signals of 630 are shown at 640.

Given the capability of the two-color CRD detection to account for both frequency- and time-dependent empty-cavity decay rates, the method is well suited for background absorption cancellation (i.e., from overlapping one-color resonances of other molecular species). Considering that the Doppler-broadened, stepwise resonance peaks are generally stronger than the Doppler-free peaks (see FIG. 3 at 310 and FIG. 4 at 410), these stepwise resonances are the preferred choice for two-color detection. To achieve the best signal-to-noise ratio (S/N), it is preferable to use a pump-probe scheme with the least amount of background absorption near the probe frequency of the two-color peak. This choice in practice can be influenced by the availability of lasers and their limited tuning ranges. In the worst-case scenario of a strong background molecular absorption which overwhelms the signal from the stepwise, two-color peak (which occurs at nearly zero probe detuning), one of the narrow, coherent two-quantum resonances is an alternative probe option to alleviate the effect from a strong background signal, considering that these resonances (such as the two resonances marked by the asterisks 311A and 314A in FIG. 3 at 310) occur at probe laser frequencies which are several Doppler FWHM away from the 2-1 resonance frequency.

In addition to the background compensation capability, the experimental flexibility in the selection of the most ideal/convenient pump-probe scheme is another benefit of the disclosed two-color excitation. As described above, one-color, two-photon CRD detection, has in principle similar background (i.e., empty cavity+one-photon absorption) compensation capability as our two-color pump-probe detection scheme. However, the one-color, two-photon method is only expected to work optimally for a limited selection of molecular species at a very specific laser frequency, because its implementation requires the existence of a fortuitous near-degeneracy in transition frequencies for a pair of linked 1-0 and 2-1 ro-vibrational transitions. Due to its one-photon probe nature, the SCAR method is not species-selective, and is thus not suitable for trace detection in the presence of strong overlapping molecular absorptions.

Figure 7:
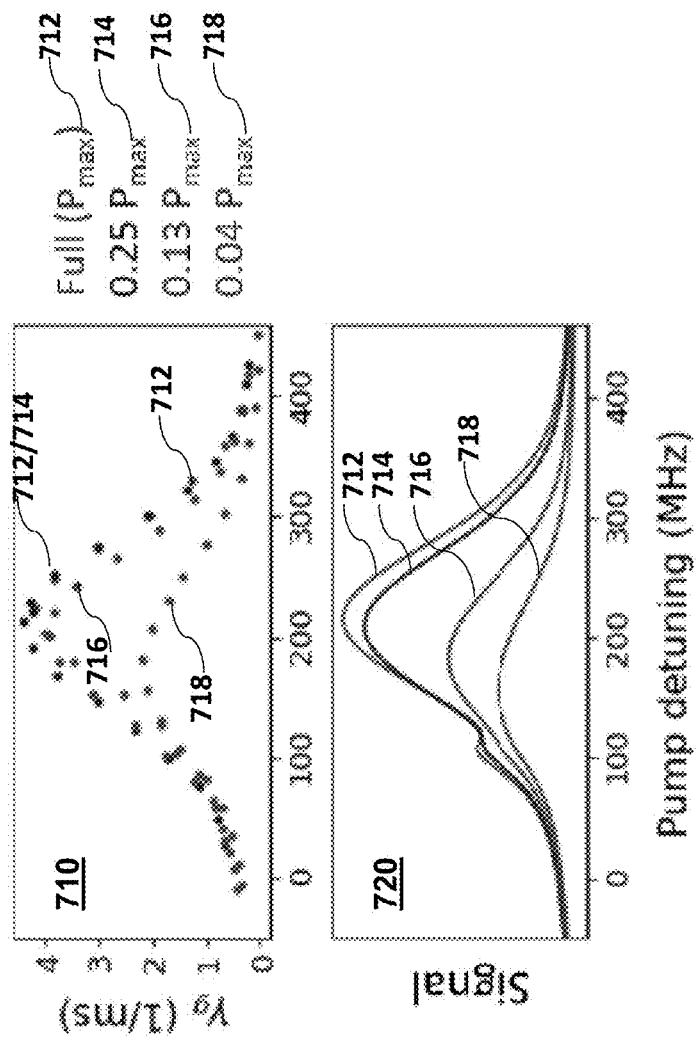
FIG. 7 shows an example of the dependence of a stepwise, two-color peak on the pump radiation power for experimental and simulated spectra at 10.2 torr.

While two-color CRD detection utilizes one more laser than SCAR and one-color, two-photon CRD detection, this additional laser can be incorporated into the detection system using a traveling-wave cavity where the combining/separation of the two orthogonally polarized, counter-propagating laser beams can be achieved using a pair of polarizing beam splitters (FIG. 2). The pump and probe beams are inherently and perfectly or near perfectly overlapped once they are individually coupled into the cavity. Furthermore, the two-color pump-probe signals are insensitive to the intracavity pump radiation power. As can be seen in FIG. 7 at 710, the intensity of the Doppler-broadened, stepwise peak does not decrease significantly, even with nearly 10× attenuated pump radiation (36 W→4.5 W). An intracavity p-mode power of 4.5 W is relatively easy to achieve with most commercial laser systems frequency-locked to a medium finesse cavity (F=5000), even for those with significantly lower output power (5 mW) than our pump QCL (50 mW). The insensitivity of the pump-probe signal to the pump laser power also means that our two-color CRD detection should be relatively immune to the intracavity pump power fluctuations (~0.5% in our current setup). For one-color, two-photon CRD detection, a ten-fold decrease in the intracavity laser power would significantly degrade its detection sensitivity and selectivity, considering that one-color, two-photon signal is proportional to the square of the laser power. Similarly, the sensitivity of SCAR detection requires substantial level of saturation at the beginning of the ringdown. A factor of ten decrease in the saturation could lead to significant decrease in its sensitivity. As can be seen in FIG. 7 at 720, the insensitivity of the stepwise two-color peak to the pump power (FIG. 7 at 710) is qualitatively captured by our simulation model. For example, the model predicts that with ¼ of the full pump power, the stepwise peak intensity remains close to that at full power. The model, however, predicts an overall faster decrease in the signal intensity than the experimental observations. No attempts are made to adjust the model parameters to better match the observed power dependence.

FIG. 7 shows an example of the dependence of a stepwise, two-color peak on the pump radiation power for experimental and simulated spectra at 10.2 torr. The full intracavity pump radiation power is estimated to be 36 W (see above).

A reduced parameter correlation from our two-color detection is one further advantage of the technique over SCAR and one-color, two-photon CRD detection. In the two-color pump-probe detection, the pump-on and pump-off decay rates are intrinsically un-correlated, because the pump-on and pump-off signals are separately measured in a 1:1 fashion. As a result, both decay rates can be determined as accurately as the decay rates measured by conventional, unsaturated, one-photon CRD detection. In comparison, both SCAR and one-color, two-photon CRD detection relies on the ability to decouple two types of decay rates from a single decay trace, i.e., $\gamma_c$ and $\gamma_g$ for the former, and linear and two-photon-absorption loss rates for the latter technique. The two decay rates determined from a single decay trace are inevitably correlated in SCAR and one-color, two-photon CRD detection. A higher degree of parameter correlations leads to higher standard deviations for the fit parameters, which effectively decreases the detection S/N. For example, even under optimal experimental conditions, the standard deviations of $\gamma_g$ from SCAR measurements are about 10× higher than those determined from an exponential decay fit, which is used for our two-color detection.

While the net $\gamma_g$ signal in the lower panel of FIG. 6 appears relatively flat, there appears to be some long-term drift in the net signal, as is reflected in its Allan deviation measurement, which has a minimum (0.36 s$^{-1}$) at 15 min. It is likely that the "noisy" flow-through condition, such as variations in the gas flow rate (which affects both the pressure and the $N_2O$ concentration in the cavity), might have contributed to this long-term drift. Based on the Allan deviation of the measured $\gamma_g$ signal in FIG. 6 at 620, the detection limit of our current two-color CRD setup is estimated to be 1×10$^{-11}$ cm$^{-1}$, or 200 ppq of $N_2O$ (30 torr). This level of sensitivity should be in principle sufficient for room temperature, two-color measurement of sub-modern (<1200 ppq) $^{14}CO_2$ sample, considering that the transitional probabilities for the $^{14}CO_2$, $v_3$=1-0 and $v_3$=2-1 ro-vibrational transitions are each about twice as strong as the corresponding $v_3$ transitions of $N_2O$. Work is under way to construct a better controlled experimental setup. A static cell measurement is likely needed to achieve longer averaging time and thus better detection sensitivity. In addition, as mentioned above, even with an attenuated (OD=1.2) probe laser beam and a late-gate for the exponential fit, the two-color probe ringdown signal still suffers from power saturation (i.e., non-exponential ringdown decay), particularly at low pressures (2.6 torr). The effect from saturation becomes less obvious for two-color signals at ≥20 torr, especially when a late-gated fit is implemented. We believe that power saturation is another factor that affects the sensitivity of our current setup, because the lower signal level from the late-gated signal (~10× lower than the full signal level) reduces the S/N for a given data collection time. Use of a higher-sensitivity mid-IR detector, e.g., liquid-$N_2$-cooled InSb detector, could potentially alleviate part of the detector sensitivity issue.

A proof of principle demonstration of mid-IR, two-color, intracavity, pump-probe CRD detection using a ladder-type, three-level system has been demonstrated based on the $N_2O$ $v_3$=1-0, P(19) (pump) and $v_3$=2-1, R(18) (probe) ro-vibrational transitions. This type of intracavity pump-probe scheme which utilizes strong mid-IR, 1-0 and 2-1 transitions is ideal for high-sensitivity and high-selectivity trace detection, and to our knowledge, it has not been previously reported in the literature. With dual-frequency-locked pump and probe lasers, we achieve high intracavity pump radiation power (36 W) and >2 kHz ringdown acquisition rates. By switching the pump radiation off during every other probe ringdown, background ringdown rates due to the empty cavity and unwanted, one-photon absorptions from non-target molecular transitions can be effectively compensated. The disclosed setup can be extended to a room temperature, $^{14}C$ quantification at sub-modern concentrations. The feasibility of the two-color CRD detection under flow-through conditions is also promising for future field-work applications, as well as CRD measurements of combusted samples following HPLC separation.

Compared to SCAR and one-color, two-photon CRD detection, the two-color CRD detection is a more generalized high-sensitivity, high-selectivity trace detection method. The mid-IR, two-color CRD detection scheme is expected to be applicable for essentially any molecular species with mid-IR, ro-vibrational transitions, which are typically strong for at least one of the vibrational modes of the molecule (e.g., the $v_3$ antisymmetric stretch mode for $N_2O$, $CO_2$, $C_2H_2$, etc.). In comparison, the use of one-color, two-photon CRD detection is highly species-dependent, due to the nature of its excitation scheme. The SCAR method, due to its one-photon nature, is not expected to work optimally in the presence of strong absorptions from non-target molecular transitions. Furthermore, in our two-color detection, the pump-on and pump-off cavity decay rates are individually determined from two un-correlated measurements. Given that these un-correlated measurements are recorded in quick succession (about every 250 μs), effective background compensation can be achieved. In comparison, in both SCAR and one-color, two-photon CRD detection, two decay rates are derived from a single decay trace, which inevitably leads to higher parameter correlations and consequently higher fit standard deviations than our two-color measurements (e.g., ~10× higher for SCAR).

In addition to its use as a high-sensitivity, high-selectivity trace detection method, the disclosed mid-IR, pump-probe scheme is well suited for rotation-state-resolved measurements of vibrationally excited states of large and non-volatile molecular species, e.g., in the 4500 $cm^{-1}$ energy region with pump and probe at 4.5 μm. High-resolution spectroscopic studies of these large molecular systems, especially at high internal energies, are challenging both experimentally (e.g., low gas-phase density, detection sensitivity and selectivity) and theoretically (e.g., wide-spread intramolecular vibrational redistribution). The Doppler-free, coherent two-quantum resonances observed in our two-color excitation scheme are likely the most suitable transitions for these high-resolution studies, due to their narrow linewidths (FWHM of ~15 MHz at 2.5 torr) and small AC Stark shifts (~1 MHz here with full pump power). Pump-induced light shifts could be in principle readily accounted for by our simulation model. With the rapid development of mid-IR radiation sources and multi-channel detectors, one potential extension of our mid-IR pump-probe scheme is the use of broadband radiation as the probe, such as a mid-IR frequency-comb (i.e., QCL-pumped, frequency-comb-probed, CRD detection) to achieve rapid, multiplexed detection with high sensitivity and selectivity.

Collisional Effects

In our simulation, we reproduce the relative intensities of the broad step-wise resonances and the Doppler-free, coherent two-quantum resonances by using a significantly slower population decay rate ($\gamma$) than the coherence decay rate ($\gamma_{ij}$), i.e., $$\frac{\gamma_{ij}}{\gamma} = 100.$$

The large $$\frac{\gamma_{ij}}{\gamma}$$

value that is needed for the simulation is in apparent contradiction with the general expectation that, for ro-vibrational transitions, the collisionally-induced population decay rate should be similar to the coherence decay rate, i.e., $$\frac{\gamma_{ij}}{\gamma} \sim 1.$$

For a two-level system, the homogenous linewidth (i.e., from collisions and power-broadening) is proportionally to $$\sqrt{\gamma_{ij}^2 + 4\left(\frac{\gamma_{ij}}{\gamma}\right)\Omega_{ij}^2}.$$

While either a large pump Rabi frequency ($\Omega_{10}$) or a large $$\frac{\gamma_{10}}{\gamma}$$

can lead to a large power-broadened 1-0 linewidth (>300 MHz), the latter choice yields a simulation that qualitatively reproduces the observed experimental features. The spectra would become dominated by the Doppler-free peaks with the reverse choice of large $\Omega_{10}$ and small $$\frac{\gamma_{10}}{\gamma}.$$

The slower than expected population decay rate required for the simulation model is a consequence of the phenomenological manner in which the collisional effects are treated—in particular for the population decay from the $v_3=1$, J=18 and $v_3=2$, J=19 levels (FIG. 1C ay 110). While rotational relaxation is expected to be fast (~100 MHz rate at 10 torr), the $v_3=1$ and 2 levels of $N_2O$ are known to have long "ensemble" vibrational relaxation time (150 μs and 80 μs, respectively, at 10 torr), based on the fluorescence lifetime measurements following excitation by a broadband molecular laser. Similarly, long vibrational relaxation time has been achieved for the $v_3=1$ levels of $CO_2$ (250 μs at 10 torr). As a result of the long vibrational relaxation time, the rotational population can be trapped in a particular vibrational level for much longer than the average collisional period. The bi-directional interaction between the pump-populated $v_3=1$ level and the $v_3=1$ rotational manifold "bath" can thus no longer be neglected. For simplicity, this bi-directional energy flow is not considered in our three-level model, for which both level 1 and 2 are assumed to decay, uni-directionally, to a common bath. The population decay rate used in a simplified model can be considered an effective, net decay rate which phenomenologically describes the bi-directional population flow from level 1 and 2 to their respective $v_3$-baths.

Figure 8:
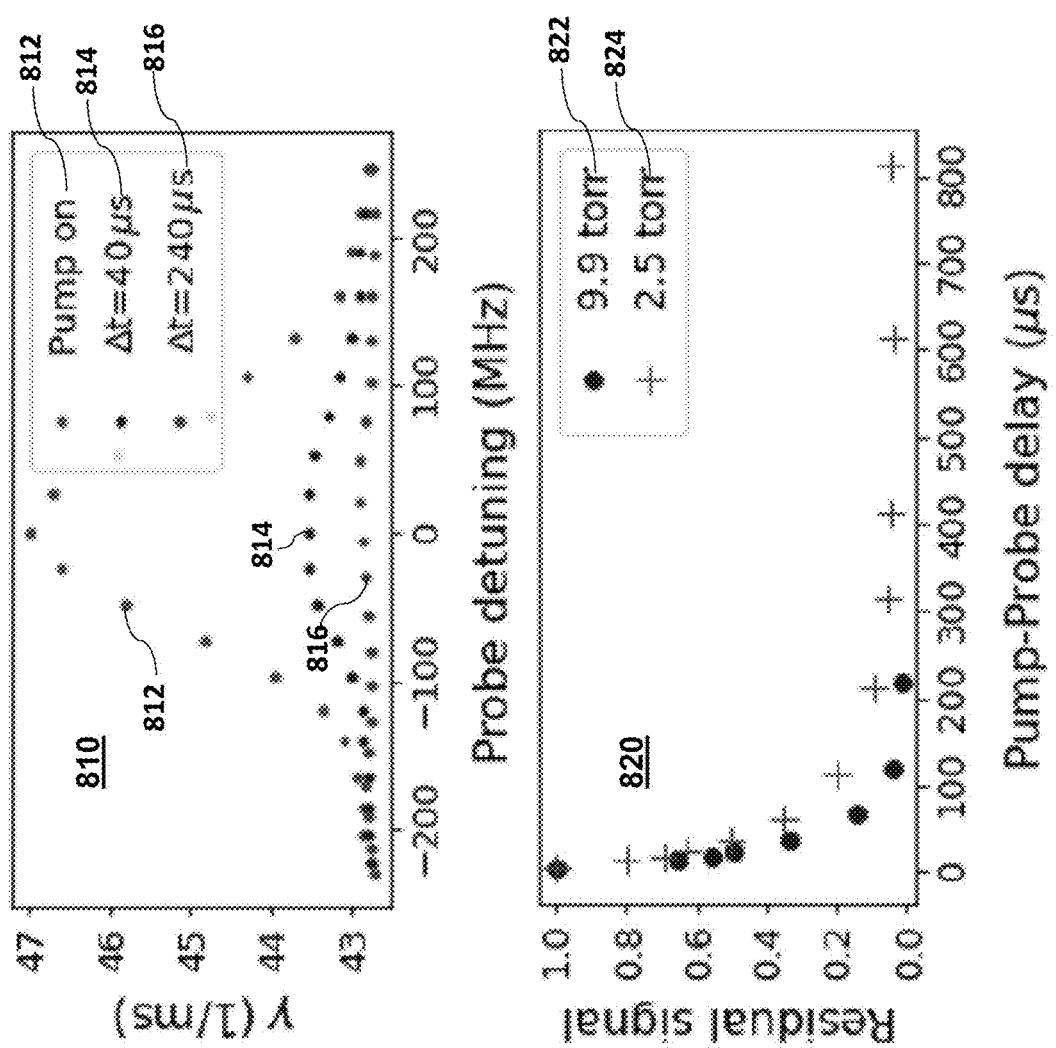
FIG. 8 shows examples of residual pump-off signals.

Using the disclosed two-color CRD detection, there is evidence that supports the long ensemble lifetime of the $v_3=1$ level. Due to the high energy of the $v_3=1$ level (~2200 cm$^{-1}$), the 2-1, R(18) probe transition cannot be observed in the absence of the pump (i.e., pump-off for the entire experiment). In the 1:1 pump switching experiments, the 2-1, R(18) transition is observed when the pump radiation is shut off close to the start of probe ringdown, e.g., a pump-probe delay (Δt) less than 50 μs. In FIG. 8 at 810, the pump-on (812) and pump-off signals with two different Δt (814, 816) are shown in the vicinity of a stepwise, two-color resonance (2.5 torr). As discussed above, the stepwise two-color resonances occur with close to zero probe detuning. As can be seen in FIG. 8 at 810, with Δt=40 μs, we still observe a strong probe absorption signal at the 2-1, R(18) transition frequency. This suggests that a significant portion of the pump-excited, $v_3=1$, J=18 population remains in the same state after the pump radiation has been off for 40 μs. In FIG. 8 at 820, the magnitudes of this residual signal are shown at 822 and 824, as a function of Δt, at 2.5 and 9.9 torr. As can be seen in FIG. 8 at 820, the residual signals decay faster at the higher pressure. However, the decay time (~75 μs and ~40 μs, respectively, at 2.5 and 9.9 torr) does not seem to decrease proportionally to the increase in pressure and the measured decay times at both pressures are shorter (e.g., ~4× shorter at 9.9 torr). The observed "lingering" residual signals are consistent with the long $v_3=1$ vibrational relaxation time. The collision-induced population exchange between the initial, pump-populated $v_3=1$, J=18 level and the long-lived $v_3=1$ bath results in a slow, net population decay out of the $v_3=1$, J=18 level.

FIG. 8 shows examples of the residual pump-off signals. At 810, the pump-on signals, and the residual pump-off signals at two pump-probe delay time are shown. The spectra are shown for 2.5 torr. At 820, the magnitude of the residual signals as a function of pump-probe delay time at two different pressures is shown.

Five-Level-System Model

The five-level-system model (see FIG. 5) is built on the three-level-system model shown in FIG. 1C at 110. It includes an additional two-level system formed by the $v_3=1$, J=16 and $v_3=2$, J=17 levels, and the collision-induced population transfer pathway, $v_3=1$, J=16 ⇔ $v_3=1$, J=18. The 2-1, R(16) transition, which occurs following this rotational population transfer, is assumed to be excited by the pump laser. These additional collision-related effects are incorporated into our simulation by modifying/adding the following components to the original three-level-system equations (Eq. (3)):

$$-\dot\rho_1 = \underline{\rho_{13}(\rho_1-\rho_3)} + \underline{\underline{\rho_{1b}(\rho_1-\rho_b)}} + i\Omega_{10}(\rho_{10}-\rho_{01}) + i\Omega_{21}(\rho_{12}-\rho_{21}) \qquad \text{Eq.(4)}$$

$$-\dot\rho_3 = \underline{\rho_{13}(\rho_3-\rho_1)} + \underline{\underline{\rho_{3b}(\rho_3-\rho_b)}} + i\Omega_{43}(\rho_{34}-\rho_{43})$$

$$-\dot\rho_4 = \gamma_4\rho_4 + i\Omega_{43}(\rho_{43}-\rho_{34})$$

$$-\dot\rho_{34} = i\Omega_{43}(\rho_3-\rho_4) + (\gamma_{43}+i\Delta\omega_{43})\rho_{34}$$

$$\rho_{34} = \rho_{43}^*$$

$$-\dot\rho_b = \gamma_{1b}(\rho_b-\rho_1) + \gamma_{3b}(\rho_b-\rho_3) + \gamma_b\rho_b, \qquad \text{Eq. (5)}$$

where the two new levels are labeled as 3 and 4 (as in FIG. 5b), $\hbar\Delta\omega_{43} = \hbar\omega_{pump} - (E_4-E_3)$ is the frequency detuning of the pump laser with respect to the 2-1, R(16) transition frequency, and Eq. (4) replaces the $-\dot\rho_1$ component in Eq. (3). The bi-directional rotational population transfer between level 1 and 3 (with rate $\gamma_{13}$) is modeled by the terms highlighted with single underlines in Eqs. (4) and (5). In our five-level model, both level 1 and 3 are further allowed to exchange population (with rate $\gamma_{1b}$ and $\gamma_{3b}$, respectively) with a common $v_3=1$ bath, which is highlighted by the double underlines in Eqs. (4) and (5). The $\gamma_b\rho_b$ term in the $-\dot\rho_b$ component of Eq. (5) allows vibrational population decay from the $v_3$ manifold. Note that, in the harmonic oscillator limit, the transition dipole moment of the $v_3=2$-1 transition is $\sqrt{2}$ larger than that of $v_3=1$-0. Under the double harmonic oscillator approximation, one obtains $\Omega_{43}=\sqrt{2}\Omega_{10}$, which is used in our simulation.

Figure 9:
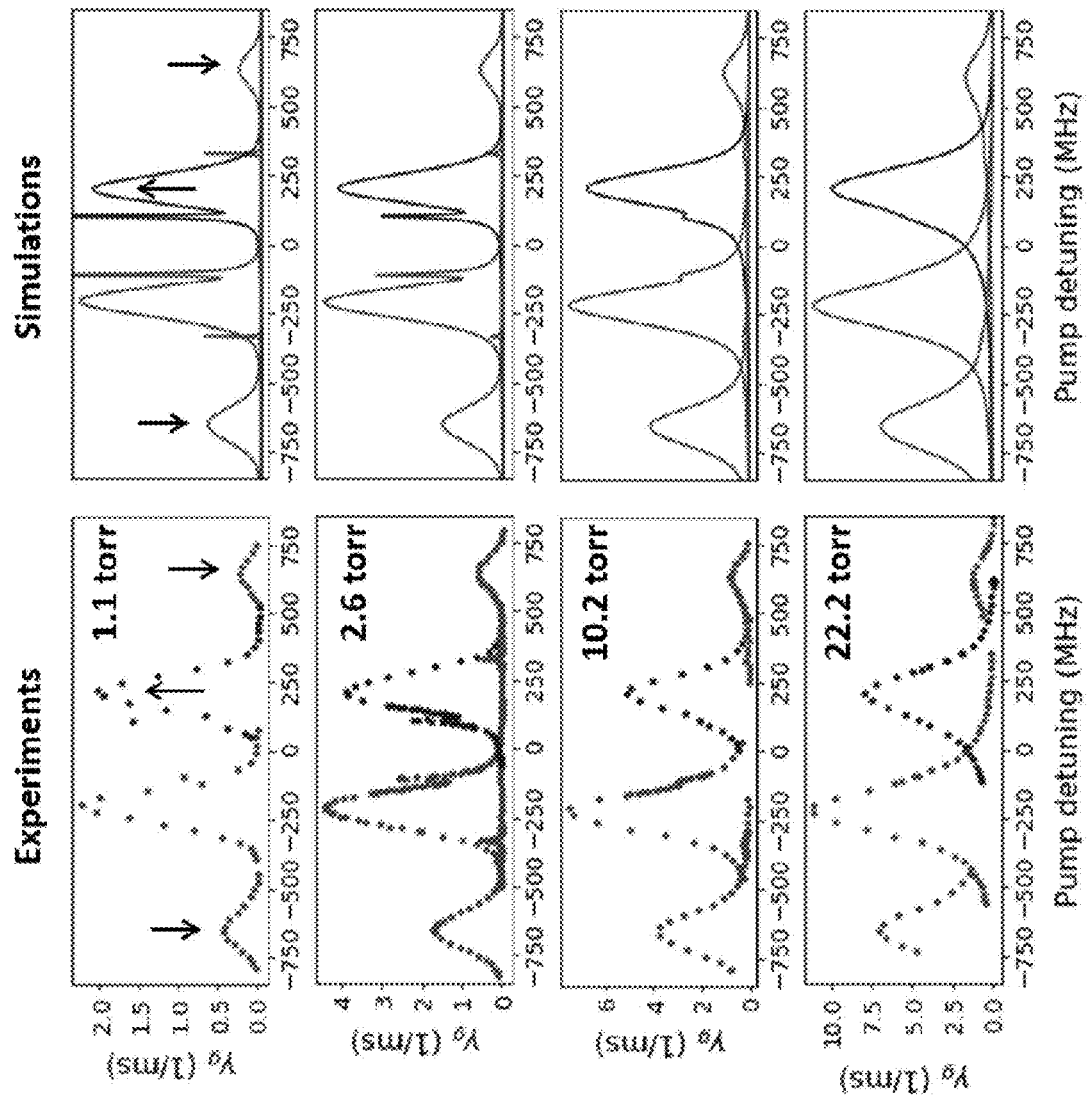
FIG. 9 shows examples of two-color CRD spectra at four different pressures.

As can be seen in FIG. 9, the five-level-system model qualitatively reproduces the pressure-dependent asymmetry for the Doppler-broadened, stepwise peaks. For example, in both experiments and simulation, the intensity ratio between the −655 MHz and +635 MHz pump-detuned peaks (indicated by the downward-pointing arrows in FIG. 9) increases as the pressure increases. Moreover, with explicit modeling of bi-directional population flows from level 1 and 3, the three relevant population decay rates involving level 1 and 3 ($\gamma_{1b}, \gamma_{3b}, \gamma_{13}$) are allowed to have similar magnitudes as the coherence decay rates ($\gamma^{col}$), in agreement with our description above. In the simulation, it is assumed that $\gamma_{1b}=\gamma_{3b}=\gamma_{13}=\gamma^{col}/2$. The factor of ½ ensures that the level 1 and 3 have the same combined population decay rates (i.e., $\gamma_{1b}+\gamma_{13}=\gamma_{3b}+\gamma_{13}=\gamma^{col}$). The five-level-system model is not expected to quantitatively describe every aspect of collision-induced effects on the two-color spectra. For example, it fails to account for the slight pressure-dependence in the intensity of the stepwise, two-color resonance peak indicated by the upward-pointing arrows in FIG. 9. These discrepancies could result from the still simplified treatments (albeit improved compared to the three-level model) of both collisional effects and light-matter interaction, e.g., the phenomenological concept of $v_3$-bath is still used in our five-level model. Uncertainties in the accuracy of our chosen parameter values (in particular, the population decay rates) could also contribute to the discrepancies. Further studies of collision-related effects on mid-IR, two-color CRD detection will be conducted in the future.

FIG. 9 shows examples of two-color CRD spectra at four different pressures. Four overlayed two-color spectra are shown in each panel. The left column contains the experimental spectra, and the right column contains simulations based on the five-level model. Note that for the spectra taken at 1.1 torr, finer frequency scans around the narrow, Doppler-free peaks are not recorded. The following parameter values were used for the simulations: $\Omega_{10}=2\pi\times 25$ MHz; $\Omega_{21}=2\pi\times 1$ MHz; $\Omega_{43}=\sqrt{2}\Omega_{10}$; $\gamma_{ij}=\gamma^{col}$ (for any i-j pair) and $\gamma^{col}/P=2\pi\times 3$ MHz (where P is the pressure in torr); $\gamma_0=\gamma^{col}$; $\gamma_{1b}=\gamma_{3b}=\gamma_{13}=\gamma^{col}/2$; $\gamma_2=\gamma_4=0.04\gamma^{col}$; $\gamma_b=0.002\gamma^{col}$.

Figure 10:
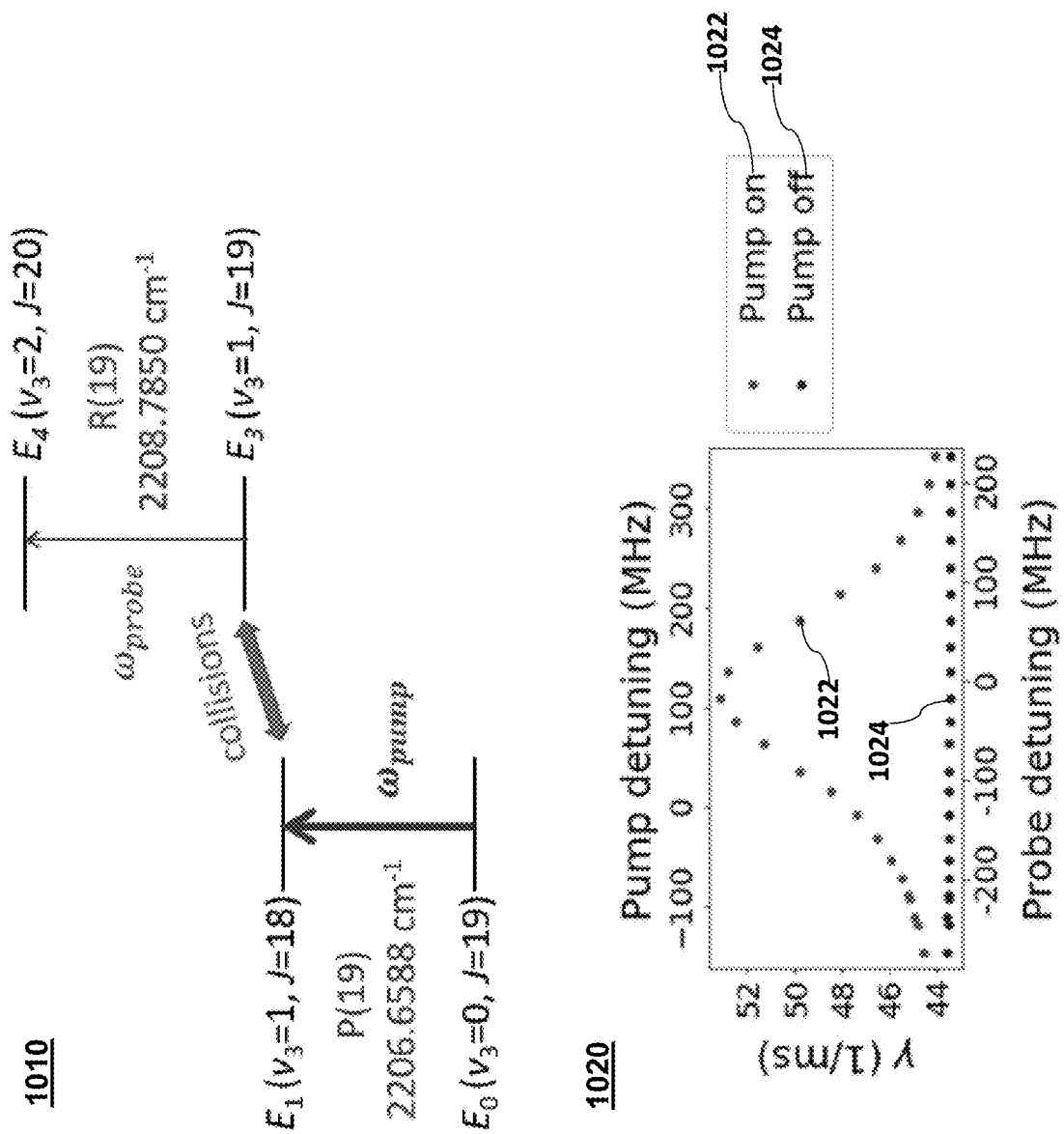
FIG. 10 shows examples of collision-induced, two-color signals.

FIG. 10 shows examples of collision-induced, two-color signals. At 1010, a level diagram illustrates the origin of the collision-induced signals. At 1020, examples of collision-induced, two-color signals at 22.2 torr. The pump detuning frequency is measured with respect to the 1-0, P(19) transition, and the probe detuning frequency is measured with respect to the 2-1, R(19) transition (2208.7850 cm$^{-1}$). Similar collision-induced, two-color signals are observed at 1.1 torr.

Due to the limited frequency-tuning ranges of our two QCLs, we are unable to directly test our hypothesis regarding the observed asymmetry among the stepwise two-color resonances, e.g., by measuring another pair of linked $N_2O$ 1-0 and 2-1 rovibrational transition using our two-color pump-probe detection. Evidence consistent with the presence of efficient collision-induced population transfer from the initial, pump-populated $v_3=1$, J=18 level has been observed. As illustrated in FIG. 10 at 1010, the 2-1, R(19) transition does not share a common level with the 1-0, P(19) pump transition. As a result, the 2-1, R(19) transition can only occur following rotational population transfer from the pump-populated, $v_3=1$, J=18 level to the $v_3=1$, J=19 level. In FIG. 10 at 1020, both the pump-on and pump-off signals are shown with dual-frequency axes, for which the "Probe detuning" axis corresponds to the detuning with respect to the collision-induced, 2-1, R(19) transition, and the "Pump detuning" axis to the usual pump detuning with respect to the 1-0, P(19) transition. Note that the magnitude of the net, collision-induced, two-color signal (9 ms$^{-1}$) is nearly as large as that of the strongest two-color signal (11.5 ms$^{-1}$, see the 22.2-torr spectra in FIG. 9) which is expected based on our pump-probe scheme (FIG. 1C). The observation of strong, collision-induced two-color signals is consistent with efficient population transfer from the initial, pump-populated $v_3=1$, J=18 level, and the possibility of further optical excitation from the collisionally-populated level.

Figure 11:
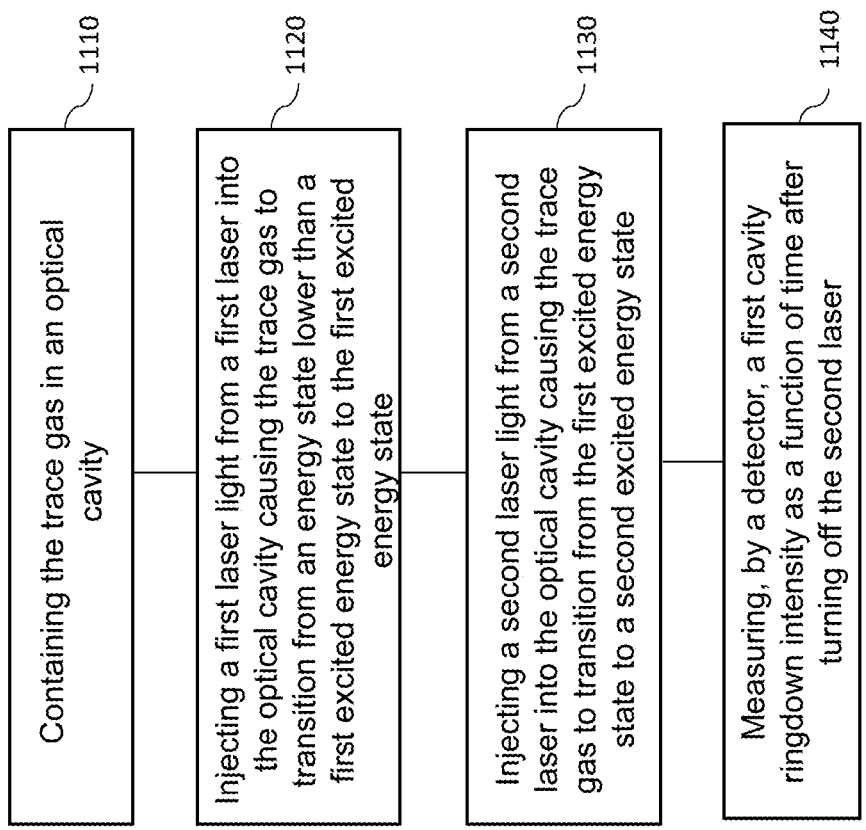
FIG. 11 shows an example of a process for detecting a trace gas in an optical cavity.

FIG. 11 shows an example of a process for detecting a trace gas in an optical cavity. At 1110, the process includes containing the trace gas in an optical cavity. At 1120, the process includes injecting a first laser light from a first laser into the optical cavity causing the trace gas to transition from an energy state lower than a first excited energy state to the first excited energy state. At 1130, the process includes injecting a second laser light from a second laser into the optical cavity causing the trace gas to transition from the first excited energy state to a second excited energy state. At 1140, the process includes measuring, by a detector, a first cavity ringdown intensity as a function of time after turning off the second laser.

In some example embodiments, the process can include the following additional steps (not shown in FIG. 11). At 1150, the process includes turning off the first laser to eliminate the trace gas in the first excited energy state. At 1160, the process includes injecting the second laser light from the second laser back into the optical cavity to pump from the first excited energy state to the second excited energy state, in the absence of the first laser. At 1170, the process includes measuring, by the same detector as in 1140, a second cavity ringdown intensity as a function of time after turning off the second laser. The process steps 1120-1170 can be repeated until the end of a data acquisition time. At 1180, the process includes a collisional step between the second pump excitation at 1130 and probe ring-down measurement at 1140. In this step, population can be transferred from the first excited state to another excited state with less interference. Steps 1130 may be referred to as "quantum state linked" and the scheme with 1180 included may be referred to as "collisionally induced."

In some example embodiments, the subject matter described herein may be embodied in systems, apparatus, methods, and/or articles depending on the desired configuration. For example, some example embodiments can be implemented using one or more of the following: electronic components, a processor executing program code, an application-specific integrated circuit (ASIC), a digital signal processor (DSP), an embedded processor, a field programmable gate array (FPGA), optical components such as detectors, lenses, lasers, and/or combinations thereof. These various example embodiments may include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. In the context of this document, a "machine-readable medium" may be any non-transitory media that can contain, store, communicate, propagate or transport the instructions for use by or in connection with an instruction execution system, apparatus, or device, such as a computer or data processor circuitry. A computer-readable medium may comprise a non-transitory computer-readable storage medium that may be any media that can contain or store the instructions for use by or in connection with an instruction execution system, apparatus, or device, such as a computer. Furthermore, some of the embodiments disclosed herein include computer programs configured to cause methods as disclosed herein.

Although a few variations have been described in detail above, other modifications or additions are possible. In particular, further features and/or variations may be provided in addition to those set forth herein. Moreover, the example embodiments described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of detecting a trace gas, the method comprising:
containing the trace gas in an optical cavity;
injecting a first laser light from a first laser into the optical cavity causing the trace gas to transition from an energy state lower than a first excited energy state to the first excited energy state;
injecting a second laser light from a second laser into the optical cavity causing the trace gas to transition from the first excited energy state to a second excited energy state; and
measuring, by a detector, a first cavity ringdown intensity as a function of time after turning off the second laser.

2. The method of claim 1, further comprising:
turning off the first laser or stopping the injecting the first laser light into the optical cavity;
injecting the second laser light from the second laser into the optical cavity to transition from the first excited energy state to the second excited energy state, in the absence of the first laser light;
turning off the second laser; and
measuring, by the detector, a second cavity ringdown intensity as a function of time, wherein the second cavity ringdown indicates a cavity ringdown rate for the cavity with no absorption from the trace gas, and with absorption from molecular species other than the trace gas and with cavity absorption.

3. The method of claim 2, wherein the trace gas is identified based on the first cavity ringdown intensity and the second cavity ringdown intensity over a measurement time.

4. The method of claim 1, wherein the first laser is a pump laser and the second laser is a probe laser, and wherein the pump and probe lasers are each frequency-locked to a cavity resonance with frequency close to a molecular transition frequency.

5. The method of claim 1, wherein the second energy state is a higher energy state than the first energy state.

6. The method of claim 1, wherein the optical cavity is high finesse.

7. The method of claim 4, wherein the pump laser is horizontally polarized and the probe laser is vertically polarized, or the pump laser is vertically polarized and the probe laser is horizontally polarized.

8. The method of claim 1, wherein the optical cavity comprises two mirrors.

9. The method of claim 1, wherein the optical cavity is configured as a ring comprising three or more mirrors.

10. The method of claim 1, wherein the detector is a mercury cadmium telluride (MCT) detector or an indium antimonide (InSb) detector.

11. The method of claim 1, wherein the first laser or the second laser is a quantum cascade (QCL) laser.

12. The method of claim 1, wherein the transitions are coherent two-photon transitions or stepwise transitions with a populated intermediate state.

13. The method of claim 1, wherein after the injecting the first laser light and the injecting the second laser light and before measuring the first cavity ringdown intensity, collisions involving the trace gas cause energy transitions from the first excited energy state to one or more third excited energy states different from the second excited energy state.

14. A trace gas detection apparatus comprising:
an optical cavity containing a trace gas;
a first laser configured to inject a first laser light into the optical cavity to cause the trace gas in the analyte to pump to a first excited energy state;
a second laser configured to inject a second laser light into the optical cavity to cause the trace gas to pump from the first excited energy state to a second excited energy state; and
a detector configured to measure a first cavity ringdown intensity as a function of time after the second laser is turned off.

15. The apparatus of claim 14, wherein the detector is further configured to measure a second cavity ringdown after the first laser is turned off or injection of the first laser light into the optical cavity is stopped, wherein the second cavity ringdown indicates a cavity ringdown rate for the cavity with no absorption from the trace gas, and with absorption from molecular species other than the trace gas and with cavity absorption.

16. The apparatus of claim 15, wherein the trace gas is identified based on the first cavity ringdown intensity and the second cavity ringdown intensity over a measurement time.

17. The apparatus of claim 14, wherein the first laser is a pump laser and the second laser is a probe laser, and wherein the pump and probe lasers are each configured to operate frequency-locked to a cavity resonance with a frequency close to a molecular transition frequency.

18. The apparatus of claim 14, wherein the optical cavity is high finesse.

19. The apparatus of claim 17, wherein the pump laser and the probe laser are configured to produce one of:
output light from the pump laser that is horizontally polarized and output light from the probe laser that is vertically polarized,
output light from the pump laser that is vertically polarized and output light from the probe laser that is horizontally polarized,
output light from the pump laser that is right-hand circularly polarized and output light from the probe laser that is left-hand circularly polarized, or
output light from the pump laser that is left-hand circularly polarized and output light from the probe laser is right-hand circularly polarized.

20. The apparatus of claim 14, wherein the optical cavity comprises two mirrors.

21. The apparatus of claim 14, wherein the optical cavity is configured as a ring comprising three or more mirrors.

22. The apparatus of claim 14, wherein the detector is a mercury cadmium telluride (MCT) detector or an indium antimonide (InSb) detector.

23. The apparatus of claim 14, wherein the first laser or the second laser is a quantum cascade (QCL) laser.

* * * * *